US012115528B2

(12) United States Patent
Von Beichmann et al.

(10) Patent No.: US 12,115,528 B2
(45) Date of Patent: Oct. 15, 2024

(54) PIPETTE AUXILIARY SYSTEM

(71) Applicant: Eppendorf SE, Hamburg (DE)

(72) Inventors: Boris Von Beichmann, Hamburg (DE); Jens Gerken, Hamburg (DE)

(73) Assignee: EPPENDORF SE, Hamburg (DE)

( * ) Notice: Subject to any disclaimer, the term of this patent is extended or adjusted under 35 U.S.C. 154(b) by 859 days.

(21) Appl. No.: 16/614,336

(22) PCT Filed: May 14, 2018

(86) PCT No.: PCT/EP2018/062343

§ 371 (c)(1),
(2) Date: Nov. 15, 2019

(87) PCT Pub. No.: WO2018/210728

PCT Pub. Date: Nov. 22, 2018

(65) Prior Publication Data

US 2020/0147602 A1 May 14, 2020

(30) Foreign Application Priority Data

May 15, 2017 (EP) .................................... 17171137

(51) Int. Cl.
*B01L 3/02* (2006.01)
*B01L 9/00* (2006.01)

(52) U.S. Cl.
CPC ............... *B01L 3/0237* (2013.01); *B01L 9/54* (2013.01); *B01L 9/56* (2019.08);
(Continued)

(58) Field of Classification Search
CPC ....... B01L 2200/0621; B01L 2200/087; B01L 2200/14; B01L 2300/025; B01L 2300/027;
(Continued)

(56) References Cited

U.S. PATENT DOCUMENTS 5,380,493 A * 1/1995 Chavez ..................... B01L 9/56 422/561
8,763,454 B2 7/2014 Camenisch et al.
(Continued)

FOREIGN PATENT DOCUMENTS

CN 101183113 A 5/2008
CN 102338653 A 2/2012
(Continued)

*Primary Examiner* — John Fitzgerald
*Assistant Examiner* — Truong D Phan
(74) *Attorney, Agent, or Firm* — Todd Lorenz

(57) ABSTRACT

The invention relates to a pipette auxiliary system for supporting manual pipetting or dispensing of a plurality of samples of a sample-holding arrangement, in particular a microtiter plate. The pipette auxiliary system according to the invention supports the manual pipetting or dispensing of a plurality of samples in a working position of a sample-holding arrangement, the pipette auxiliary system comprising: a base apparatus comprising a positioning device which is designed to position the sample-holding arrangement in the working position inside a positioning space of the base apparatus, said positioning space being opened at least along a plane for the pipetting; the sample-holding arrangement which has a plurality of sample holders; a measurement arrangement comprising a plurality of measurement elements which are positioned at least in the working position underneath this plane and using which the occupancy state of at least one sample holder can be detected in the working position; and an output device or a light arrangement using which the sample-holding arrangement can be illuminated in accordance with this occupancy state of this at least one sample holder.

15 Claims, 11 Drawing Sheets

Figure 1A:
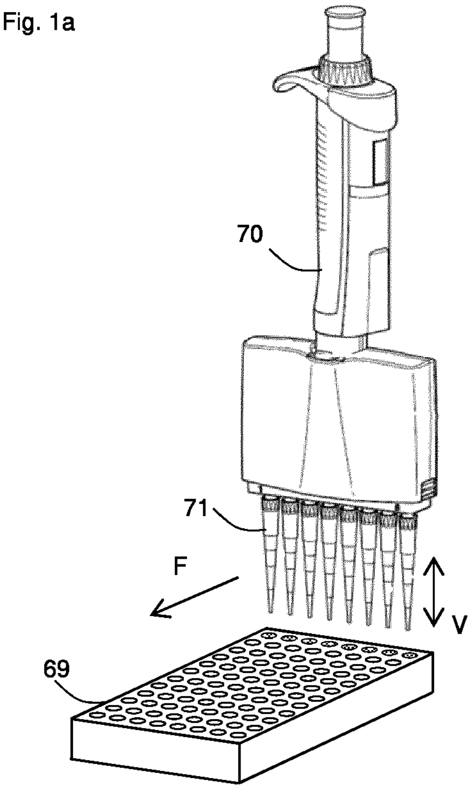

(52) U.S. Cl.
CPC . *B01L 2200/0621* (2013.01); *B01L 2200/087* (2013.01); *B01L 2200/14* (2013.01); *B01L 2300/025* (2013.01); *B01L 2300/0627* (2013.01)

(58) Field of Classification Search
CPC ..... B01L 2300/0627; B01L 2300/0663; B01L 2300/0829; B01L 3/0237; B01L 9/54; B01L 9/56; B01L 2200/025; B01L 2200/023; B01L 2300/0609; B01L 2300/0645; B01L 2300/0636; B01L 2300/08; B01L 2300/0832; B01L 3/5085; B01L 9/00; B01L 9/06; B01L 9/523; B01L 9/52; B01L 2300/0861; B01L 3/50857
See application file for complete search history.

(56) References Cited

U.S. PATENT DOCUMENTS

| | | | | |
|---|---|---|---|---|
| 2004/0160328 | A1* | 8/2004 | Becknell | A47L 15/4418 340/620 |
| 2007/0072168 | A1 | 3/2007 | Ryle et al. | |
| 2009/0000403 | A1* | 1/2009 | Magnussen | B01L 3/0237 73/864.18 |
| 2009/0010811 | A1 | 1/2009 | Richard et al. | |
| 2010/0097231 | A1 | 4/2010 | Elsenhans | |
| 2010/0283485 | A1* | 11/2010 | Valisuo | G01D 5/2405 324/663 |
| 2011/0064812 | A1* | 3/2011 | Bahl | A61K 9/5169 514/569 |
| 2013/0302847 | A1 | 11/2013 | Mix et al. | |
| 2014/0253305 | A1* | 9/2014 | Rosenberg | G01L 1/22 345/174 |
| 2015/0239130 | A1* | 8/2015 | Buchloh | B25J 15/0608 294/212 |
| 2016/0003859 | A1* | 1/2016 | Wenczel | C12M 23/38 422/561 |
| 2017/0274372 | A1* | 9/2017 | Katano | G01N 35/1002 |
| 2017/0322194 | A1* | 11/2017 | Petcavich | G01N 33/4836 |
| 2017/0370956 | A1* | 12/2017 | Hurwitz | C12Q 1/6806 |

FOREIGN PATENT DOCUMENTS

| | | | |
|---|---|---|---|
| CN | 103501909 | A | 1/2014 |
| EP | 2669011 | A1 | 5/1994 |
| JP | 08-094642 | A | 4/1996 |
| JP | 11-218437 | A | 8/1999 |
| JP | 2000-019099 | A | 1/2000 |
| JP | 2008161833 | A | 7/2008 |

* cited by examiner

PIPETTE AUXILIARY SYSTEM

The invention relates to a pipette auxiliary system for supporting the manual pipetting of a plurality of samples of a sample-holding arrangement, in particular a microtiter plate. Furthermore, the invention relates to compounds of a pipette auxiliary system and procedures.

The pipetting of samples with respect to a microtiter plate denominates the aspiration of the sample from a sample holder, in particular a sample container, into a sample transfer container, in particular a pipette tip, by means of a pipetting apparatus and denominates furthermore the release of a sample from such sample transfer container into the sample holder. Sample-holding arrangements, as they are represented for example by microtiter plates, exhibit a plurality of sample holders for the storing of the samples, or the execution of reactions in the samples or of processing steps with the samples. Mostly before the execution of the desired task, partially also during such a task, the sample holders of such sample-holding arrangements need to be filled successively by pipetting resp. treated successively by pipetting. If automated laboratory machines are used, such filling can be executed without the intervention of the user and without errors. The present invention relates to the correct addressing of the sample holders at the successive manual handling by means of pipetting.

At the manual pipetting a typical work flow comprises the following steps:

(i) Uptake of the sample to be pipetted into the at least one sample transfer container(s), (ii) Selection of one or—for example in the case of a multi-channel pipette—several sample holders, (iii) Release of the sample(s) into the previously selected sample holders by means of the pipetting apparatus, (iv) Memorizing the address of the already filled sample holders, (v) if necessary, uptake of one—or several—other samples by means of the pipetting apparatus, (vi) Selection of the successive next, not yet filled sample holders, and repetition of the steps (ii) through (v), until all sample holders are filled as desired. At these manual processes, various mistakes can be made inadvertently by the user between the aforementioned steps, when for example one or several sample holders are inadvertently repeatedly filled, or left out by mistake and not filled at all.

In practice, at the manual pipetting also the selective uptake is of importance, i.e. the uptake of samples from well-defined wells of a microtiter plate, resp. the selective release and the selective transfer between microtiter plates. For example, the samples can be transferred into a different microtiter plate—with the same or a different raster, resp. pattern, or into different vessels, e.g. reactions-/analysis-vessels. In comparison to the methodical and complete pipetting of a microtiter plate, the selective processing requires the users to be even more concentrated and bears an even higher risk for pipetting mistakes.

The correct manual addressing and filling of the sample holders requires a substantial degree of concentration from the users and oftentimes also slows down the processes in the laboratory. It is therefore a technical problem that does not occur for automated laboratory devices.

From U.S. Pat. No. 7,544,330 B2, a pipette auxiliary system for assisting the manual pipetting of a microtiter plate is known, with which the aforementioned mistakes can be avoided partially. The sample tracking system for microtiter plates described therein provides to output to the user the information on the occupancy state of a sample holder after the pipetting by illuminating the sample holder, in order to avoid an addressing mistake during the selection of the sample holders that are to be processed. The occupancy state is recognized automatically after the pipetting by automatically positioning an infrared laser, which is attached to a robotic arm and which is part of a measurement arrangement, above the sample holders, and by registering the light, which is transmitted perpendicularly through the sample holder, by means of a detector. A sample holder containing a sample generates different detector signal than a sample holder without a sample, so that at least such an occupancy state of the sample holder can be distinguished. The necessary positioning system of the measurement arrangement represents a high requirement on the setup and a complex positioning mechanics. Positioning mechanics are fundamentally error-prone, which can lead to problems in the positioning and therefore to measurement errors as well as to increased maintenance efforts. Furthermore, in such measurement arrangement the robotic arm of the positioning mechanics is arranged in the space above the microtiter plate, where the user has to operate with the pipetting apparatus. Therefore there is the risk of contacting and misaligning the positioning mechanics during the handling. On the other hand, the handling is complicated in this space as it is occupied by the positioning mechanism.

In this light, the present invention addresses the task to provide a pipette auxiliary system for supporting the manual pipetting of a plurality of samples of a sample-holding arrangement, that can be employed efficiently and that can be operated comfortably.

The invention solves this task by means of the pipette auxiliary system according to claim 1, the base apparatus according to claim 16 in conjunction with the sample-holding arrangement according to claim 17, the base apparatus in claim 18, and the procedures according to claims 19 and 20. Preferred embodiments are in particular subject of the dependent claims.

The pipette auxiliary system according to the present invention serves for supporting the manual pipetting resp. dispensing of a plurality of samples in a working position of a sample-holding arrangement by means of a pipetting- or dispenser apparatus, which is guided by the user, in which the pipette auxiliary system comprises:

a base apparatus with a positioning device, which is configured for the positioning of the sample-holding arrangement at the working position within a positioning space of the base apparatus, which is open at least along one plane for pipetting, the sample-holding arrangement, that comprises a plurality of sample holders, a measurement arrangement comprising a plurality of measurement elements which are positioned at least in the working position underneath this plane and using which the occupancy state of at least one sample holder can be detected in the working position.

an output device for outputting to the user information on the occupancy state of at least one sample holder, and an electronic control device, which is configured to detect the occupancy state of at least one sample holder in the working position by controlling the measurement arrangement and to output, in accordance with the occupancy state of the at least one sample holder, to the user the information on the occupancy state of that sample holder.

With the user-assisting auxiliary functions being realized by a measurement arrangement, which is arranged in the working position underneath the plane of the positioning space, the risk of damaging the measurement arrangement during the handling is drastically reduced. Furthermore, the space above that plane is freely accessible to the user for a visual inspection under an arbitrary angle and for the manipulation at the sample holders by pipetting. The configuration according to the present invention furthermore extends the flexibility in applying a pipette auxiliary system, as the detection of the occupancy state of the one or several sample holders is rendered possible already during the pipetting. With the measurement not being hindered by the operations of the user in the space above the positioning space, already the dipping of a sample transfer container, in particular of a pipette tip, into the sample-holding chamber of a sample holder can be followed in real time as an occupancy state if the measurement arrangement is configured accordingly. In this case, the user can also be informed via the output device, again in real time, about the occupancy state of one or several specific sample holders, so that the user could be warned in case of need before a possibly wrong pipetting via a corresponding output of information, in particular via an illumination of the sample holder.

The positioning device ensures a reliable relative positioning of the sample-holding arrangement and the base apparatus, so that the other components of the system, in particular the measurement elements and/or the output device, can each adopt a single relative position with respect to the sample-holding arrangement and the base apparatus. By this, the precision of the handling of the pipette auxiliary system is improved.

In a first preferred embodiment of the invention, the plurality of measurement elements is a fixed component of the sample-holding arrangement and the output device is a fixed component of the base apparatus. The measurement elements are preferentially electrodes that can be implemented in particular as electric conductors of the sample-holding arrangement. These electric conductors are implemented in particular as an electrically conductive polymer, so that the sample-holding arrangement can be produced by means of injection molding, in particular 2K injection molding. The pipette auxiliary system according to the first preferred embodiment preferentially comprises as output device a light arrangement as a component of the base apparatus according to the first preferred embodiment, with the sample-holding arrangement according to the first preferred embodiment being positionable in the positioning space and comprising a plurality of measurement elements. The sample-holding arrangement according to the first preferred embodiment and the base apparatus according to the first preferred embodiment each comprise preferentially a coupling device, for coupling the plurality of measurement elements to a transmission arrangement, which is in particular component a component of the base apparatus. As will be explicated later, the transmission arrangement can be designed for the transmission of optical signals and/or the conductance of electrical signals. According to the first preferred embodiment of the invention, also the base apparatus according to the first preferred embodiment, being utilizable for the sample-holding arrangement according to the first preferred embodiment, is considered as an independent subject matter of the invention. According to the first preferred embodiment of the invention, also the sample-holding arrangement according to the first preferred embodiment, being utilizable on the base apparatus according to the first preferred embodiment, is considered as an independent subject matter of the invention.

In a second preferred embodiment of the invention, the plurality of measurement elements and the output device are fixed components of the base apparatus. The pipette auxiliary system according to the second preferred embodiment comprises the base apparatus according to the second preferred embodiment, and the sample-holding arrangement can be positioned in positioning space of said base apparatus. The sample-holding arrangement according to the second preferred embodiment is configured to allow for the plurality of measurement elements in the working position being arranged with the plurality of sample holders, so that occupancy state of at least one sample holder can be measured. This can in particular be carried out by inserting the plurality of measurement elements in the working position into at least one cavity of the sample-holding arrangement. In particular, a measurement element can be inserted into a cavity located between two sample holders. According to the second preferred embodiment of the invention, also the base apparatus according to the second preferred embodiment, being utilizable for the sample-holding arrangement according to the second preferred embodiment, is considered as an independent subject matter of the invention. According to the second preferred embodiment of the invention also the sample-holding arrangement according to the second preferred embodiment, being utilizable on the base apparatus according to the second preferred embodiment, is considered as an independent subject matter of the invention.

In a third preferred embodiment of the invention, the plurality of measurement elements and a plurality of output element of the output device are fixed components of the sample-holding arrangement. The output elements can be light elements, and can in particular be implemented as light diffusing optical elements, to which the light is guided through optical transmitters of the sample-holding arrangement, or as electroluminescent polymers that are excited to emit light via electrical conductors of the sample-holding arrangement. The pipette auxiliary system according to the third preferred embodiment comprises the sample-holding arrangement, that comprises the plurality of measurement elements and the plurality of output elements of the light arrangement. The sample-holding arrangement according to the third preferred embodiment and the base apparatus according to the third preferred embodiment each comprise preferentially a coupling device, for coupling the plurality of measurement elements to the transmission arrangement, which is a component of the base apparatus, and for coupling the plurality of output elements to an additional transmission arrangement, which is a component of the base apparatus. As will be explicated later, each of these transmission arrangements can be designed for transmitting optical and/or electrical signals. According to the third preferred embodiment of the invention, also the base apparatus according to the third preferred embodiment, being utilizable for the sample-holding arrangement according to the third embodiment, is considered as an independent subject matter of the invention. According to the third preferred embodiment of the invention, also the sample-holding arrangement according to the third preferred embodiment, being utilizable on the base apparatus according to the third preferred embodiment, is considered as an independent subject matter of the invention.

Preferentially, the sample-holding arrangement comprises electrical conductors. These electrical conductors are implemented in particular as one or several electrically conductive polymers, so that the sample-holding arrangement can be produced of polymer preferentially entirely, in particular by means of injection molding, in particular two-shot molding, or by means of thermoforming.

A conductive polymer can be formed in particular by addition of electrically conductive filling material such as graphite, carbon, carbon-nanotubes, and fragments of these compounds to a support polymer, in particular PP, PE, PS, PC, in particular if the filling material constitutes 40 to 80 percent by mass of the conductive polymer. An electrically conductive polymer can be chosen in particular as an intrinsically conductive polymer: suitable are in particular Poly-3,4-ethylenedioxythiophene) (PEDOT, or also PEDT), in particular with polystyrene sulfonate (PSS) as counterion (PEDOT:PSS); polyaniline (PAni); polyparaphenylene (PPP); particularly preferred: polypyrrole (PPy); doped polythiophene (PT).

The measurement arrangement comprises preferentially sensor devices, in particular a plurality of sensor devices. A sensor device comprises preferentially one or two measurement elements. It can also comprise more measurement elements. The sensor devices are arranged preferentially in a pattern. This pattern corresponds preferentially to the pattern of the arrangement of the sample holders of the sample-holding arrangement. In particular, in the working position a sensor device is assigned preferentially to every sample holder. This can be implemented by positioning at least one measurement element of every sensor device next to at least one sample holder, in particular to precisely one sample holder. In the working position, the at least one measurement element is arranged preferentially at the side of the sample holder. In the working position, the at least one measurement element of the sensor device is arranged preferentially underneath, preferentially partially or completely underneath, the sample holder. In the working position, at least one measurement element, in particular more than one measurement element and in particular precisely two measurement elements can be arranged preferentially on the side of a sample holder—or several sample holders, in particular in a lower section of the sample holder. The lower section of a sample holder can be defined as a fraction of the complete height of the sample holder. The complete height of the sample holder can in particular be defined as the vertical distance between the lowest position and the highest position of the inner wall of the sample holder. That fraction can be selected from the group of preferred fractions f={0.5; 0.33; 0.25; 0.2; 0.15; 0.1; 0.05}. By arranging the one measurement element, resp. the several measurement elements in the lower section of the sample holder, the measurement elements can be configured in compact shape, and by this be particularly robust. Furthermore, the inserting volume required for the insertion of the measurement elements into the at least one cavity of the sample-holding arrangement is small, so that a compact and simple design of the sample-holding arrangement is rendered possible. If the measurement elements, in the working position, are aligned underneath the sample holders, no cavity in the sample-holding arrangement is required for positioning the measurement elements sufficiently near the sample holders for allowing for a successful measurement of the occupancy state or filling level. In the working position, the measurement elements can be in contact with an outer wall of the sample holders, in particular in the lower section of the sample holder and in particular with a bottom wall of sample holder, or be distanced from that outer wall, resp. bottom wall. In particular a capacitive measurement can be successful in the case of such alignment of the measurement elements, as the effect of the electrical field between two measurement elements that act as two capacitor electrodes extends into the space, which is outside of the volume between the two measurement elements.

Here, the direction "upwards" indicates a direction perpendicular to the plane A, which is, for the intended use of the pipette auxiliary system, the direction opposite to that of the gravity, thus a denomination of the direction in the conventional usage. The direction "downwards" indicates accordingly the direction of gravity, seen in the intended use of the pipette auxiliary system. Accordingly, "lateral" indicates a position translated parallel in radial direction with respect to the central axis of the sample holder, in particular to one of the essentially vertical side walls of the sample holder. This holds true also for a wall of the sample holder with an inclined orientation, as it is typical for usual conical shape that can facilitate the insertion of the sample containers or pipette tips into the sample holder.

The measurement arrangement, in particular a sensor device, is preferentially configured to measure a capacitance or a change of a capacitance. The measurement arrangement, in particular a sensor device, comprises furthermore preferentially at least one pair of electrodes that are electrically insulated in particular from each other and that facing each other in particular in such a way that they incorporate at least partially the sample-holding chamber of at least one sample holder as a dielectric of the capacitor volume between each other. It is also possible and preferred that the sample-holding chamber of at least one sample holder is not placed between the electrodes of the sensor device, but outside of the volume between the electrodes. In this case, the sample-holding chamber of at least one sample holder is inserted in particular into the volume defined as the capacitor volume, which is under the effect of the electric field of the electrodes. The change of the permittivity caused by a change of the content of the capacitor volume can then be measured electrically. In this way, it can be in particular detected whether or not a sample is present in the sample-holding chamber of the sample holder. By this, a distinction can preferentially be made between the sample-holding chamber being rather filled to ¼, ½, ¾ or 4/4 (completely), overfilled, or not filled. A precise determination of the filling volume is not possible by this approach, and is also not aspired for with this embodiment. Nevertheless, a measurement of the filling level can be realized, with the measurement resolution being determinable with simple experiments. The preferred measurement resolutions of the sensor device will be described in the following.

The shape of an electrode for the capacitance measurement can be rod-shaped, and/or is preferentially in the shape of a plate (plate element), with its shape being adjusted in particular to the shape of the sample holder resp. the sample-holding chamber of the sample holder. An electrode can be designed in particular planar. The principal plane of such a planar electrode can be arranged horizontally, which is in particular parallel to the opening of a sample holder, or vertically, which is in particular perpendicular to the opening of a sample holder. The area $A_{Electrode}$ of an electrode can dependent on the area $A_{Bottom}$ of the bottom of the sample holder or on the cross section of the opening $A_{Opening}$, in particular via $A_{Electrode}=C*A_{Bottom}$ or $A_{Electrode}=C*A_{Opening}$. The bottom of a sample holder can be considered as the section of the inner side of a sample holder with a projection onto the horizontal area or the plane A exhibiting an area of a size different from zero. In case of a cylindrical sample holder, the bottom area is defined by area of the base of the cylinder. In the case of the bottom being of the shape of a spherical segment resp. of a rounded-off shape, the bottom area is defined by the curved, non-vertical portion of the inner side of the sample holder. Furthermore—or alternatively—the bottom can also be defined as the portion of the inner side of the sample holder, which is located in the lower range of the sample holder—this definition is useful in particular for mostly narrowing resp. conically shaped sample holders. An electrode can comprise in particular a shape of a spherical segment and can be in particular mostly semicircular. Two planar electrodes of a sensor device can be shaped each as a spherical segment resp. as a semicircle, in which case the straight edges of the areas being can be arranged at a distance from each other and facing each other, and can be parallel to each other. Both electrodes can be arranged in particular essentially completely or mostly vertically underneath the bottom or the opening of the sample holder.

In the case of an essentially cylindrical sample holder with a cylindrical sample-holding chamber the electrode exhibits the shape of a corresponding section of the cylinder barrel, which is arranged in the vicinity of the sample-holding chamber resp. the sample holder. The shape of the electrode can also differ partially or essentially along the entire length of the sample holder from the shape of the sample holder, in particular from its outer shape.

In the case of a sample-holding arrangement configured according to one or several SLAS industry standards and in particular in case of a sample-holding arrangement, which is a microtiter plate configured according to one or several SLAS industry standards, the measurement arrangement that can be in particular a component of the base apparatus can be configured to reach into the cavity, which is provided underneath the sample holders of the microtiter plate. According to the industry standard microtiter plates can comprise flat, round or conical bottom shapes of sample holders. In all cases, a cavity of at least 1 mm height remains accessible underneath the sample holders, in which in the working position the measurement arrangement can be arranged partially or completely. This can be learned from the Standard ANSI SLAS 2-2004 (R2012). Therefore, the measurement arrangement is configured preferentially such that the measurement arrangement and its measurement elements can be arranged partially or completely in the positioning space, in particular in the range, in which the cavity of the sample-holding arrangement is arranged in the working position. In particular, the measurement arrangement or its measurement elements are arranged preferentially not above this area. Preferentially, the measurement arrangement and its measurement elements are arranged partially, mostly or completely in a range, which is located in the positioning space between 0.0 mm and 1.0 mm above the base apparatus, in particular above the support points of the base apparatus. The support points constitute the range of the base apparatus that the sample-holding arrangement contacts in the working position, and on which the sample-holding arrangement rests in the working position. The foot of the microtiter plate that contacts the support points of the base apparatus, as well as the vertical minimal distance (0.0394 inch=1.0 mm) between the lowest section of the foot—corresponding to the support points—and the bottom of the sample holders of the microtiter plate are depicted in ANSI SLAS 2-2004 (R2012) on page 6 in the upper figure. In the case of round or conical bottom sections of the microtiter plate, sections of the cavity underneath the sample holders that can be utilized for the arrangement of the measurement elements in the working position can also be located above the 1.0 mm plane.

In the case of an essentially cuboid-shaped sample holder with a cuboid-shaped sample-holding chamber, preferentially the electrode exhibits the shape of a corresponding planar, in particular rectangular, plate section, which is arranged in the vicinity of the sample-holding chamber, resp. the sample holder. In the case of an at least partially—for example in the bottom section—sphere-shaped sample holder and/or in the case of an at least partially sphere-shaped sample-holding chamber, preferentially the electrode exhibits the shape of a corresponding at least partially sphere-shaped plate section, which is arranged in the vicinity of the sample-holding chamber, resp. the sample holder. In the case of an at least partially—for example in the bottom section—cone-shaped sample holder and/or in the case of an at least partially cone-shaped sample-holding chamber, preferentially the electrode exhibits the shape of an at least partially cone-shaped plate section, which is arranged in the vicinity of the sample-holding chamber, resp. the sample holder. These embodiment options take up on the established, commercially available embodiments of the microtiter plate wells. These are in particular available as microtiter plates with an F-bottom (flat), U-bottom (round), and V-bottom (conical).

A plate element can each also be configured as a foil. The electrode extends preferentially along the entire length of the sample-holding chamber in the vertical direction in order to allow for an efficient measurement both at very small filling volumes and at complete filling. The electrode in the working position is separated preferentially by an insulation, in particular by an insulating layer, from the sample-holding chamber, in order to avoid electrochemical reactions at the electrode if a fluid sample is arranged in the sample holder in the working position. The electrode is preferentially of the form as a foil. The electrode is preferentially an electrically conductive polymer, and it is produced in particular by means of a process of injection molding or thermoforming. The electrode can also consist of metal or comprise metal, in particular aluminum, copper or silver.

An electrode extends preferentially in the lower section of the entire length of the sample-holding chamber in vertical direction, by which also a measurement at very small filling volumes as well as at complete filling can be executed efficiently, as the effect of the electric field generated by the electrodes between them during the capacitance measurements extends also into the range above the electrodes.

The shape of the electrode can in particular be meander-like. In particular in the case of a capacitance sensor device, a second electrode can be provided, which is in particular grounded, and which is arranged at a distance to the first electrode, and that can run parallel to that first electrode. Pairs of electrodes can each comprise digital elements that are arranged intercalatedly, resp. comb-like with respect to the digital elements of the opposing electrode. These electrodes can be arranged meander-like intercalatedly. A first electrode can be configured as a core electrode, in particular as a circular electrode, and the second electrode can be arranged as a hole electrode in the plane of that core electrode outside of the core area of the core electrode, so that the core electrode is arranged in the hole of the hole electrode. The second electrode can also be arranged parallel to the core electrode, in particular underneath the core electrode, and it can be configured in particular as a cup electrode, by raising at least one side wall of the cup electrode starting from the bottom section of the electrode to the height of the core electrode, with the electrodes being always distanced from each other.

The electrode, resp. several or all electrodes of the measurement arrangement can be connected to the control device, which is in particular arranged at the sample-holding arrangement by at least one conductor, in particular at least one or several conductor paths. Conductor paths can consist of an electrically conductive plastic or they can comprise such. The conductive structures can also be realized by injection molding, in particular by two shot molding. Alternatively, both the electrodes as well as the conductor paths can be realized by electrically conductive foil elements. The sample-holding arrangement, in particular a microtiter plate, can be contacted from the outside for example via appropriate landing pads by spring contact pins/contact needles of the base apparatus. Alternatively, contact springs or -pins could be molded into the conductive plastic of the microtiter plate and then be connected with corresponding landing pads on the base apparatus. Every sensor device can be assigned to at least one or two, in particular exactly one or two, conductor(s), through which the at least one measurement element can be connected with an electronic circuit that can be in particular part of the electronic control device. Such an arrangement with individual contacts for every measurement element offers a particularly high measurement precision. Therefore, in the case of 96 sample holders, in particular a total of 96 or 192 conductors can be provided.

Also, more than one measurement can be assigned to a single conductor, resp. be connected with it, by which in particular less conductors are required than measurement elements or than pairs of measurement elements. In particular, it is possible to connect a row of measurement elements or a section of a row of measurement elements by means of a single conductor, resp. conductor path. A measurement arrangement can be formed of rows and columns of measurement elements, e.g. a matrix of 8 rows×12 columns=96 measurement elements/pairs of measurement elements. If, for example in a matrix of measurement elements, each sensor device comprises exactly one first measurement and a second measurement element, then the first measurement elements can be connected by exactly one first conductor and the second measurement elements of the row by exactly one second conductor. In the case of 12 rows and 8 columns, only 8×2=16 conductors are required for realizing a suitable measurement during the pipetting and by this a pipette auxiliary. When pipetting with a multi-channel pipette, bearing a number and arrangement of pipette tips that corresponds to a column, successively in a direction along the row the occupancy state of every sample holder of a column can be registered individually.

Generally, it is also possible to connect all first measurement elements of several rows or columns and/or rows, or of an entire matrix arrangement as well as subsections by means of one first conductor each, and all second measurement elements of such a selected arrangement with a second conductor, in particular in the case of successively pipetting only individual sample holders, e.g. when using a single channel pipette. This requires a sufficient sensitivity of the electronic control device that addresses the measurement arrangement and evaluates the measurement signals.

Preferentially, the sample-holding arrangement does not comprise an electronic circuit. On the sample-holding arrangement, in particular on its bottom or at least one side, preferentially contact sites for establishing an electronic contact are provided. The contact sites of the sample-holding arrangement can be connected via at least one contact site each with a corresponding contact of an electronic control device. In the case of a measurement arrangement using optical signal transmission, the contact site is replaced analog by an optical contact site that allows for the transmission of a light signal through the contact site.

Preferentially, at least one measurement element is arranged in the upper half of a sample holder, in particular at the upper edge of a sample holder. By this, a change of the occupancy stat of a sample holder can be recognized early, in particular when the user begins to dip a sample-transfer container, in particular a pipette tip, through the upper plane into the sample-holding chamber of the sample holder. A measurement element implemented as one unique electrode (single electrode) is arranged preferentially in the upper half of a sample holder for measuring the change of capacitance of that electrode against a ground electrode, with the later being provided by the base apparatus. When an electrically conductive sample transfer container—resp. a sample transfer container that comprises an electrically conductive material—, in particular a conductive pipette tip, is brought in the vicinity of the measurement element implemented as single electrode, the capacitance of the single electrode is changed, in particular by increase of the capacitance, and this change can be measured. The single electrode can be implemented as a ring electrode, that, in the working position, is arranged at the upper edge of a sample holder. The ring electrode can in particular be permanently connected to the sample-holding arrangement. In particular, two sensor devices can be assigned to one sample holder. One of them can comprise in particular the described single electrode, in particular in the upper range. The other sensor device, comprising one or two electrodes, can be arranged in particular in the lower range of the sample holder. The upper range of a sample holder can be regarded in particular as a fraction f of the entire height of the sample holder, stretching from the upper edge of the sample holder downwards.

The measurement elements, in particular the measurement electrodes, can also be printed onto the sample-holding apparatus or the base apparatus by means of a printing process. Equally, the output elements of the output device, which is in particular the light elements of a light arrangement, can be printed onto the sample-holding apparatus or the base apparatus by means of a printing process. Equally, electronic conductor paths, with which in particular the measurement elements or the output elements will be connected or are connected to the electronic control device, can be printed onto the sample-holding apparatus or the base apparatus by means of a printing process. Measurement electrodes and conductor paths can be printed in particular by printing liquids with conductive organic or inorganic materials. They can be printed in particular by printing liquids with a metal containing liquids. Such a metal containing liquid can contain in particular silver or gold, in particular silver particles or gold particles. In particular also conductive polymers can be printed. Suitable printing processes are inkjet-, screen-, offset-, flexo- and gravure-printing. The sample-holding arrangement comprises preferentially a planar surface, onto which the corresponding elements, which is in particular the measurement elements and/or the conductor paths and/or the output elements, can be printed. The planar surface can be in particular a planar top side or a planar bottom side of the sample-holding arrangement. The printing of the elements offers the advantage of low costs and a high throughput at the fabrication of the sample-holding arrangements. This is in particular of advantage in the case of the sample-holding arrangements being provided as disposables.

Measurement elements and/or conductor paths and/or output elements can also be prefabricated partially or completely and can be connected with the sample-holding apparatus or the base apparatus. In this case, it is possible to connect—in addition to these elements—a support element, e.g. a support foil, together with the elements to be mounted. The connection is preferentially a material connection, the connection is in particular carried out preferentially by gluing.

The experimentally confirmed model that already a sample transfer container, which is filled with an electrically conductive sample but which by itself is not electrically conductive, is suitable for realizing such a measurable change of capacitance of a single electrode, is the basis of this invention. It was demonstrated experimentally that the parasitic coupling via the plastic casing and the user himself, who is holding the pipette in the hand, and the further surrounding with the ground of the circuit was sufficient for obtaining a measurable change of the capacitance by the vicinity of the pipette tip. A pipette tip of a conductive plastic can be detected both filled as well as empty. An electrically non-conductive pipette tip can be detected, if is filled with e.g. water. By this, a sample-holding arrangement, resp. a pipette auxiliary system can be provided at relatively low costs.

A measurement of the occupancy state can carried out not only via a measurement of the electric capacitance. The measurement arrangement is furthermore preferentially configure to employ an optical signal transmission, in particular to measure a light quality or its change, in particular a light intensity or light color after the transition of the light through the sample-holding chamber of a sample holder, resp. the measurement chamber, in order to detect the occupancy state of the sample-holding chamber, resp. the measurement chamber. To this aim, a first measurement element, operating as light emitter, is arrange at a sample holder and a second measurement element, operating as a light receiver, is provided. The measurement element can be implemented in particular as a light deflection element, in particular as a prism element or a reflective element. In this case, a light source, in particular an LED, can be a component of the base apparatus.

Preferentially, the sensor device is a capacitive sensor device that registers a change of the capacitance value caused by the pipetting process. Preferentially, the sensor device is an optical sensor device that registers a change of an optical property. The measurement is carried out in such a way that a change of the occupancy state of a measurement chamber is registered, with that measurement chamber comprising at least a part of the sample holder or the entire sample holder. The occupancy state changes if an object is inserted into the measurement chamber. The object can be in particular a liquid sample or a pipette tip, in particular a pipette tip filled with an aqueous solution, resp. with an electrolyte, as it is typically the case for pipetting processes.

A sensor device is configured preferentially to generate at least one measurement signal, which is characteristic for the predefined occupancy state. The occupancy state is characterized by the distinct and distinguishable occupancy of at least one measurement chamber. In the present invention, two distinguishable occupancy states are to be understood as the presence of two different arrangements of a measurement chamber and an object in different states each that can be distinguished by means of the sensor device. The number M>0 of distinguishable occupancy states of preferentially at least one sensor device or preferentially every sensor device is 2<=M<=10, preferentially 2<=M<=6, particularly preferred 2<=M<=4. In the present invention, the number M is referred to as the measurement resolution of the sensor device. For the aims of the present invention a low measurement resolution M is sufficient as a precise determination of the filling volume is not the goal of the invention, but only the distinct differentiation of the occupancy state.

A measurement resolution M is considered a preferred solution to the problem, if two occupancy states of a sample holder can be distinguished by the measurement, with the two filling levels of the sample holder differ from each other by preferentially 50% or preferentially 25% of the complete volume of the sample holder, in particular at least two of the filling states, if the sample holder is filled with a liquid sample to 0%, 25%, 50%, 75% or 100%. Preferentially, the measurement resolution is such, that all filling states 0%, 25%, 50%, 75% or 100% can be distinguished from each other. A measurement resolution is considered a preferred solution to the problem, if the occupancy states 0% and 50% and optionally also 100% can be distinguished from each other. A measurement resolution is considered a preferred solution to the problem, also if the insertion and/or the removal of the pipette tip filled with an aqueous solution into the sample holder resp. in the range of the upper edge of the sample holder can be registered. Such low measurement resolutions are not suitable for the determination of the precise filling level of a sample holder, but suitable for the purpose of the present invention. Preferentially, the measurement arrangement is not configured for the determination of a filling level of at least one sample holder.

In another preferred embodiment of the invention, the measurement resolution M>10, in particular M>20, in particular 6<=M<=10000, in particular 6<=M<=1000, in particular 6<=M<=100, and is therefore suitable for determining a more defined resp. precise filling level of the sample holder. In particular to this aim, the sensor device can be configured to carry out a suitable measurement method with the aim of determining the filling level, in particular an impedance measurement, in particular by applying an alternating voltage to one electrode serving as a transmitting element while the other electrode serves as a receiving element.

In order to measure such small capacitances resp. changes of capacitance during the determination of the occupancy states, e.g. an electronic control device can be utilized, in particular a micro controller (MCU) with an electronic circuit for the registration of small capacitances and/or small changes of capacitance. Preferentially, the measurement arrangement comprises a micro controller for addressing in particular at least one, in particular at least two, or in particular for the individual or in particular pairwise addressing of a plurality of measurement elements implemented as electrodes. Preferentially, this micro controller comprises a Touch Sensing Controller (TSC) as it is in particular utilized for the measurement of touch sensitive areas in touch sensors. Such micro controllers with TSC are in particular commercially available from STMicroelectronics, Geneva, Switzerland, in particular the model STM32L073xx is suitable. They are a matter of electronic circuits for the registration of small capacitance changes.

Such a micro controller comes with in particular a special hardware called Touch Sensing Controller (TSC) for monitoring capacitive "Touch keys", i.e. touch-sensitive areas as input tools. The standard application of this Touch Sensing Controller is the measurement of the capacitance of a contact area with respect to the ground potential. The application of the TSC-MCU can in particular provide the following approaches that can be carried out correspondingly by means of the electronic control device in combination with the TSC-MCU: that capacitance, here the capacitance of the electrode(s), is charged repeatedly and discharged into a reference capacitance. This process is repeated until the voltage at the reference capacitance reaches a threshold value. The number of required charging/discharging cycles is counted and stored in a register of the MCU provided to this aim. The larger is the number of cycles the larger is the measured capacitance. In the experiments that form the basis of this invention, it was found surprisingly that in particular such a TSC-MCU is suitable for the detection of the occupancy states in the framework of the invention.

For carrying out a suitable measurement method for the determination of the occupancy state in the sample holders of a sample-holding arrangement, the capacitance between the two electrodes at the walls of a sample holder can be measured. To this aim, for example one of both electrodes is connected to ground (GND) and the other to the input of the TSC of the MCU. By this, the capacitance of the arrangement with respect to ground can be measured.

Furthermore, also the presence of a pipette tip or of a dispenser tip, in particular Eppendorf Combitips®, in the measurement chamber resp. in the close vicinity of a sample holder can be detected. To this aim, an electrode can be mounted in the upper range of a sample holder, in particular at the upper edge, and be connected to the measurement input of the touch sensing controller. If now an electrically conductive pipette tip or dispenser tip is connected to ground, the capacitance of the electrode in the upper range of a sample holder to the ground is increased upon approach of the pipette tip/dispenser tip.

On the basis of the information from the measurement or the detection of the pipette tip/dispenser tip, an information can be output to the user. This can be carried out preferentially by in particular a colored illumination of a sample holder. The information that have been gathered from the capacitive sensor system can also be combined with information from the pipetting apparatus/the dispensing apparatus. To this aim, the electronic control device of the pipette auxiliary system, which is arranged in particular in the base apparatus and another electronic control device of the pipetting apparatus resp. the dispenser apparatus are configured to communicate with each other via a signal connection, in particular a data connection, i.e. in particular analog or digital, in particular tethered or wireless, e.g. via a Bluetooth connection or a radio network (WLAN). A WLAN can be configured generally according to the standard of the IEEE-802.11 family. For the implementation of such a data connection, communication devices are provided at each electronic control device, e.g. a network adapter. The data connection serves the purpose of exchanging data, unidirectionally and/or bidirectionally. Said control devices, in particular the control programs executed by their data processing devices, can be configured to exchange data through communication devices. For example, the transmission of control data with the content of the message "release liquid" to the electronic control device of the pipette auxiliary system could trigger there the measurement of the occupancy state and a feedback to the user could happen about the successful release into the correct sample holder by means of the output device, in particular a light arrangement.

For carrying out the capacitance measurement with two electrodes, it is in particular not provided in the framework of the present invention to have one of the electrodes implemented as a transmission element and the other electrode as a receiving element, in particular a precise measurement of the impedance is not aimed for. In particular, for the measurement no permanent temporally sinusoidally varying voltage is applied to the electrode and in particular no alternating voltage is applied. Such measurements are complex and are not imperatively needed in the present invention for obtaining the desired, relatively low measurement resolution by means of capacitance measurements.

Preferentially, an optical sensor device comprises as measurement elements at least one optical emission element and at least one optical receiving element that are arranged preferentially parallel to a sensor area of the sensor section, which is in particular parallel to the plane A. By this, a compact design of the optical sensor device is possible, and light conducting elements can be provided for guiding the light between the optical emission element and the receiving element through the measurement chamber, in particular light conducting elements selected from the group: lens element, prism element, mirror element, optical fiber. It is also possible and preferred to arrange the at least one emission element and the at least one receiving element at opposite sides of the measurement chamber or a section of the measurement chamber. By this, in particular a sensor device can be realized that works following the principle of a photoelectric barrier.

The emission element of an optical sensor device is preferentially an LED, in particular an OLED, preferentially a laser diode, in particular a vertically emitting laser (VCSEL), because such light sources being constructed compactly, integrated on an IC substrate exhibit simultaneously a high luminosity, in particular a low energy consumption and in particular a relatively low ratio luminosity/energy consumption.

The emission element of an optical sensor device is furthermore preferentially an LED, in particular an OLED, in particular an infrared-LED. The usage of a light source for visible light, in particular with wavelengths between 380 nm and 780 nm, has the advantage that the functioning of the sensor can be verified more easily by the user and furthermore that visible light is well suited for reflective arrangements for reflecting the emitted light and for receiving it again. The usage of infrared light, in particular with wavelengths between 780 nm and 1000 nm, resp. 780 nm and 1500 nm, has the advantage that the sensor area can be covered by a material layer that is non transparent for visible light, in particular by a protective layer or stains, which broadens the range of available material layer in comparison to the LEDs emitting in the visible range and makes the read-out more reliable. Furthermore, infrared light is absorbed, according to the infrared spectrum of water, in a technically sufficiently exploitable manner in the aqueous solution of the liquid sample pipetted in the sample-holding chamber, so that the occupancy of the sample holder with aqueous solution can be detected by means of infrared light.

The output device is preferentially a component of the base apparatus. The output device is positioned preferentially underneath the plane A, and is positioned in the working position preferentially underneath the sample-holding arrangement. The output device can comprise a plurality of output elements. One, preferentially every, output element is assigned in the working position preferentially to one each or exactly one sample holder of the sample-holding arrangement, is in particular positioned underneath a sample holder. An output element can comprise a mechanical display element, for example a rotating element that comprises visually different, in particular differently colored display surfaces that can be presented to the user by rotation and that represent the occupancy state. The display element can be powered from underneath by the base apparatus, and can, in the working position, be brought to the sight of the user in particular through an opening each in the sample-holding arrangement. In the case of a transparent implementation of the sample-holding arrangement, a display element can be positioned in the working position underneath the sample-holding arrangement.

The output device is also preferentially a component of the sample-holding arrangement.

The output device can also be a component of another laboratory apparatus that constitutes a part of the pipette auxiliary system. This laboratory apparatus can be the pipetting apparatus or dispenser apparatus, with which the user manually pipettes the samples at the sample-holding arrangement.

The output device is preferentially configured to output optical signals, in particular via a light arrangement or a display. But it can also, in particular additionally, be configured to output acoustical signals. The output device can comprise in particular a speech-generating device. The electronic control device can be configured to output at least one information in dependence of the measured occupancy state of at least one sample holder, in particular the Information on the position of the measured sample holder and/or the information on the occupancy state measured there. An information can be displayed by means of a graphical symbol, in particular a written description, on the display and/or can be coded by the speech generator and be output by speech-generating device. A position of the measured sample holder can be output in particular as a coordinate: in the case of microtiter plates, typically a coordinate system of letters and numbers is used.

In case of the output device being implemented as a light arrangement, the output element corresponds to a light element.

The light arrangement comprises a multitude or plurality of light elements. A light element is preferentially a light source, but can also be a light emitting element. For example, a light element can be provided by the output port of an optical fiber, which is coupled in particular to at least one light source. A light source is provided preferentially by a light-emitting diode (LED), in particular a semiconductor-LED or an organic LED (OLED), or it comprises one of these. The light source can be provided in particular by a photoluminescent polymer. The light source can be in particular a laser diode, preferentially a Vertical-Cavity Surface-Emitting Laser (VCSEL).

On the light conduction: A light element is configured preferentially to illuminate in the working position exactly one—or at least one—sample holder. This is carried out such that the user, who is generally observing the sample-holding arrangement from above the plane A, can clearly recognize the illumination of an individual sample holder and furthermore distinguish it clearly from the illumination of another, in particular a neighboring sample holder. Here, it is preferred that the light emitted by a light element is coupled into the sample holder resp. the sample-holding device, which is designed preferentially at least partially transparent and that it leaves that sample holder resp. sample-holding arrangement again on the top side, directional or by diffusion at the sample holder resp. the sample-holding arrangement, in particular at its surface. The sample holder resp. sample-holding arrangement can also comprise at least one opening or cavity for allowing the light emitted by the light element to exit preferentially from below through this opening or cavity in the direction of the observer. In the case of the light elements in the working position being arranged on the top side of the sample-holding arrangement, a transmission of the light through the sample-holding arrangement is not necessary, but neither is it in the case of a corresponding conduction of the light. The light emitted by the light element can be restricted to a solid angle resp. focused to a range of the sample-holding arrangement resp. sample holder. To this aim, a light conducting element can be provided—in particular as a component of the light arrangement and in particular positioned at the light element—in particular a lens element, an aperture, a prism, a mirror element etc.

The light arrangement comprises preferentially a plurality of light emitting diodes, in particular a matrix of light-emitting diodes, with which the individual sample holders can be illuminated. This serves for the guidance of the user and for the output of an optical feedback with the aim of informing on the dosage of liquid into the respective sample holder.

The light arrangement comprises preferentially light elements, in particular a plurality of light elements. The light elements are arranged preferentially in a pattern resp. a matrix. This pattern corresponds preferentially to the pattern with which the sample holders of the sample-holding arrangement are arranged. In particular, a light element is assigned in the working position preferentially to every sample holder. This can be carried out by positioning at least one light element in the vicinity of at least one sample holder, in particular in the vicinity of exactly one sample holder, in particular by arranging it underneath the plane of the bottom walls of the sample holders and in particular by arranging it directly underneath the sample holders. The at least one light element can be arranged in the working position also laterally to a sample holder. In the case of the sample-holding arrangement comprising the light arrangement, the light elements can also be positioned at the top edge of the sample holders.

A light element is preferentially configured to be operated with a predefined illumination type. The electronic control device is configured preferentially to operate the at least one light element in a predefined illumination type. The illumination type can be defined by the light emitted by the light element resp. by the light reaching the user from the illuminated sample holder: color of the light resp. wavelength, intensity, temporal variation of these parameters, in particular of the intensity, i.e. pulse frequency or continuous light. The illumination type of the illumination of a sample holder depends in particular on the individually measured occupancy state of the sample holder. The intensity of the illumination can be in particular zero, so that formally a deactivated illumination can also be considered as an illumination type.

The electronic control device, also termed control device, in particular its electronic circuit resp. micro controller, is preferentially a component of the base apparatus, which is an apparatus, which is preferentially separated from the sample-holding arrangement.

A data processing device is preferentially a component of the electronic control device, that controls the functions of the pipette auxiliary system. The functions of the control device are implemented in particular by electronic circuits. The control device can comprise a micro processor that can contain the data processing device. The control device and/or the data processing device is designed preferentially for the execution of a control process, which is also termed control software or control program. The functions of the pipette auxiliary system and/or the control device can be described as processing steps. They can be implemented as components of the control program, in particular as subprogram of the control program.

In the framework of the present invention, a control device generally comprises in particular the data processing device, in particular a calculating unit (CPU) for processing of data, and/or a micro processor, or it is the data processing device. The data processing device of the control device of the pipette auxiliary system is configured preferentially also for the control of a treatment process and/or of individual treatments, that are executed by one or several in particular optional treatment devices of a laboratory apparatus.

The data processing device is alternatively preferentially an apparatus, which is arranged outside the pipette auxiliary system and separated from it, which is also termed an external apparatus resp. external data processing device. The data processing device and the pipette auxiliary system are linked preferentially via a signal connection or a data connection, and are preferentially components of a network for the exchange of data. In this case, the data processing device and the pipette auxiliary system are in particular components of a system according to the present invention for the monitoring of a manually operated pipetting process. The pipette auxiliary system can, in this case, be provided without an electrical control device and serves in particular essentially as an adapter apparatus, with which the addressing of the measurement arrangement and of the light arrangement is mediated between the external electronic control device resp. the external data processing device and the sample-holding arrangement. Preferentially, the control device comprises a data storage device, in particular a measurement data storage, for storing the at least one measurement value that defines the occupancy state. By this, different embodiments of the pipette auxiliary system can be realized according to the present invention. The data storage device is accommodated preferentially in a physically re-writable memory element, e.g. RAM, FLASH-memory, EEPROM, but it can also be arranged in different memory elements.

The pipette auxiliary system resp. its electronic control device is configured in particular to exchange data with an electronic laboratory journal (ELN), a laboratory information and management system (LIMS) or a laboratory device management system. By this, in particular the occupancy state data and/or data of a pipetting planning program and/or control data can be exchanged in order to archive the data, in particular for the purpose of documentation or for realizing via this connection the control of at least one laboratory apparatus, in particular the control of the pipette auxiliary system.

In a preferred embodiment of the pipette auxiliary system, it comprises the pipetting apparatus (or the dispenser apparatus, not always mentioned in the following) as a system component, by which the user executes the pipetting processes at the sample-holding arrangement. Preferentially, the electronic control device of the pipette auxiliary system and/or the base apparatus as well as the pipetting apparatus comprise each a communication device, so that a tethered or preferentially a wireless data connection can be established for the exchange of data.

In a preferred embodiment of the invention, the electronic control device of the pipette auxiliary system is a component of the pipetting apparatus, by which the user executes pipetting processes at the sample-holding arrangement. In this case the pipette auxiliary system comprises also the pipetting apparatus in addition to the base apparatus and the sample-holding arrangement. In particular, the pipetting apparatus controls in this case in particular: —the execution of a pipetting planning program, that guides the user during the manual pipetting in particular according to a predefined sequence; —the triggering of a measurement with at least one measurement element of the measurement arrangement at least one sample holder; —the output of the information on the occupancy state at this at least one sample holder.

Preferentially, the control device comprises at least one program data storage, in which the program code can be stored. The program code provides preferentially to use at least one measurement value and to analyze it.

In the framework of the present invention, a pipette auxiliary system or a control device, which is designed or configured for providing a certain function is to be understood as such a pipette auxiliary system or such a control device, which is not only in principle enabled to execute that function, e.g. after deploying a software, but that possesses already all means to actually fulfill that function by possessing e.g. the required electronics, the required program code resp. the required software, in particular in the form of a firmware of the pipette auxiliary system resp. its control device. The means for the execution of this function comprise in particular an analysis device. In particular, the means for the execution of this function, in particular the analysis device, can provide e.g. accordingly designed electric circuits, that analyze e.g. an analog signal representing a measurement value, and compare it e.g. by means of a comparator circuit to a reference signal (reference value). In particular in the case of a measurement value provided digitally these means can comprise a digital signal processing device. For the analysis of the at least one measurement value, the control device comprises preferentially an electric analysis device.

The electronic control device is configured in particular to address the measurement arrangement electrically in the working position and to analyze the obtained measurement signals.

The electronic control device is configured in particular to execute a measurement method at the measurement arrangement in order to detect the occupancy state of at least one sample holder. The electronic control device is configure in particular to execute a measurement method at the measurement arrangement in order to detect the occupancy state of several sample holders, e.g. one column of sample holders in the case of a matrix-shaped arrangement of sample holders. In the case of a capacitance measurement, the measurement arrangement is addressed electrically, in the case of an optical measurement, the measurement arrangement is addressed preferentially with light signals.

The electronic control device is configure in particular to execute a calibration method at an empty sample-holding arrangement and/or during the successive filling of a sample-holding arrangement, in particular of a certain type of sample-holding arrangement. To this aim, measurement results are registered that are the results of an empty or a known occupancy state at the sample-holding arrangement. Such measurement results of a calibration method are stored preferentially as reference data in a data storage device that can be a component of the electronic control device and/or the base apparatus. These reference data can be utilized in an analysis method executed in one of the electronic control devices in order to determine the respective occupancy state by comparison of the measurement values with reference values of the reference data.

The electronic control device is configured in particular to execute a diagnosis method with an empty sample-holding arrangement or with a base apparatus, which is not equipped with a sample-holding arrangement, but which is optionally equipped with a test plate. To this aim, the conductors to one, several, or to all measurement elements and/or output elements/light elements are addressed electrically or optically and the measurement results obtain with this process are compared to reference values. In particular, a certain reference capacitance can be assigned or is assigned to the neighboring contact sites provided preferentially by base apparatus of a sensor device to be contacted. Defects or dirt on the contact can be detected by this diagnosis method. The test plate can comprise reference elements that each replace a sample holder equipped with a measurement element. By this, in particular also the diagnosis of optical contact sites of the base apparatus is rendered possible.

It is in particular possible and preferred, to configure the electronic control device such or to user allow the user to adjust it such, that the calibration method is executed at an empty sample-holding arrangement obligatorily resp. individually for every sample-holding arrangement after and/or as soon as the sample-holding arrangement is placed in the positioning space. For detecting this circumstance resp. moment, a short position test process can be provided, in which the arrival of the sample-holding arrangement in the positioning space is detected in particular with at least one position sensor connected with the electronic control device. The position sensor can be e.g. an optical sensor or a mechanical push switch. For the aim of registering, the measurement arrangement can be queried repeatedly at certain time intervals. In this, it is detected whether resp. from when on a measurement value typical for the presence of a sample-holding arrangement in the positioning space is detected. The electronic control device can be configured to signal the success resp. if necessary the failure of the calibration to the user, in particular by means of an optional signal device or the output device, in particular the light arrangement—see the explanations on the connection test process below. In particular by means of a suitable data transfer, the success resp. if necessary the failure of the calibration can be signaled to the user via the display of a laboratory apparatus associated to the pipette auxiliary system, in particular via the display of the pipetting apparatus, with which the user executes also the pipetting processes at the sample-holding arrangement.

By the obligatory execution of the calibration method, the reliability of the detection of the occupancy states resp. of all occupancy states can be improved. On the other hand, the individual calibration of the sample-holding arrangement offers the advantage of measures and tolerances being less critical. The effort in the production of the sample-holding arrangement can be reduced, if greater tolerances for the measures of the structures relevant for the measurement are admitted. Such structural measures are in particular the positioning of the contact sites or coupling sites or the positioning of the measurement elements at the sample-holding arrangement.

The electronic control device is configured in particular to execute a position test process at an empty sample-holding arrangement. The scope of this process it to detect whether the working position has been established correctly. To this aim, at least one position sensor connected with the electronic control device can be provided at the base apparatus, with which the working position can be verified. Alternatively, the working position can be verified for the execution of the position test process by means of the measurement arrangement and the sample-holding arrangement received in the positioning space.

The electronic control device is configured in particular to execute a connection test process at an empty sample-holding arrangement for testing whether every sensor device of the measurement arrangement is connected in an acceptable manner with the electronic control device, in particular electrically or optically. In this process the measurement results are not necessarily stored as data. The electronic control device can be configured to signal to the user, in particular by means of an optional signal device, whether at least one of the sensor devices had not been connected correctly, and to signal if necessary which of the sensor devices had not been connected correctly. Alternatively or additionally it can also be signaled if all sensor devices have been connected correctly, and/or it can be signaled, which of the sensor devices had been connected correctly. This can be carried out in particular by means of the output device, in particular a light arrangement.

The output device, in particular the light arrangement, can be configured to signal to the user information on the result of a registration process, a diagnosis method, or an individual calibration method, a position test process and/or a connection test process by means of the output device, in particular the light arrangement, in particular to signal in a distinguished manner. In particular the result of every of the said processes or other processes can be signaled by means of a different output quality, in particular a color or a temporal illumination frequency, in particular a continuous or blinking output/light of at least one or all output elements/light elements of the output device/light arrangement.

The electronic control device is configured preferentially to illuminate the sample-holding arrangement in the working position by means of the light arrangement, in particular to not activate the light arrangement if no sample-holding arrangement is placed in the positioning space.

The electronic control device is configured preferentially to control the output device, in particular the light arrangement, in dependence of a pipetting planning program. A pipetting planning program realizes in particular a control plan, by the means of which the user is guided by the respective output of information on the target positions to be pipetted. This guidance is carried out by outputting, in dependence of a pipetting plan, which is e.g. stored in the control device, information by means of the output device that indicate to the user the target positions of the manually operated pipetting processes. The target positions correspond to certain sample holders of the sample-holding arrangement. By means of an exemplary pipetting planning program, it is indicated to the user to fill the sample-holding arrangement systematically, e.g. column-wise and step-wise. By means of another exemplary pipetting planning program, it is indicated to the user to fill the sample-holding arrangement step-wise in a randomized manner, i.e. according to a random pattern or a pattern, which is not revealed to the user but is stored in the pipetting apparatus.

The electronic control device is configured preferentially to control the output device, in particular the light arrangement, in dependence of the occupancy state of the at least one sample holder that has been detected by means of the measurement arrangement. To this aim, the electronic control device provides preferentially a logic device for outputting an information to at least one sample holder, in particular for illuminating at least one sample holder.

The logic device can be realized by an analog- and/or digital electronic circuit. In particular the measurement results of the measurement arrangement can be analyzed electronically and—in dependence of this electronic analysis—the output of the information/illumination of the sample-holding arrangement by means of at least one output element/light element can be controlled electronically. In particular the addressing of the respective output element/light element and its activation resp. deactivation can be controlled electronically.

The logic device can be realized also with a control program resp. a control software. To this aim, the electronic control device is configured preferentially for the data processing.

The electronic control device resp. the logic device is configured preferentially for the execution of at least one of the functions listed in the following, with which in particular the output logic/illumination logic of the pipette auxiliary system can be defined, in order to deliver to the user the corresponding signals and with this the auxiliary information, which is provided by the pipetting auxiliary:

The output type/the illumination type for at least one sample holder is dependent on the measured occupancy state of the sample holder. In particular, a change of the occupancy state can be signaled by a change of an output quality, in particular the illumination type, for example by a change of color. By this, the event of occupying a sample-holding chamber of a sample holder with a liquid sample can be signaled to the user or the entry of at least one sample transfer container, in particular a pipette tip, into a measurement chamber can be signaled in real time.

The output type/the illumination type for at least one second sample holder is dependent on the measured occupancy state of at least one first sample holder. In particular, a change of the occupancy state of the at least one first sample holder is signaled by a change of the output type/the illumination type for the at least one second sample holder, for example by the activation of an illumination or by a change of color. In this way, the at least one second sample holder is emphasized by an optical indication. This can be used for indicating to the user the next target namely at least one or several sample holders that need to be processed, in particular filled, manually in the following step (Follow-up pipetting). By this one can minimize the risk that an inadvertent secondary filling of an already filled sample holder or an inadvertent omission of the filling of a correct target (here: the at least one second sample holder) occurs during the manual pipetting. Typically, the filling of a sample-holding arrangement with a matrix-shaped arrangement occurs column-wise, in particular by means of a multi-channel pipette. But it can also occur according to a pipetting planning program provided by the electronic control device, in particular according to a pipetting planning program executed by a data processing device that can be stored in particular in the electronic control device and that can be influenced resp. defined in particular by the user by inputting a program parameter via a user interface of the electronic control device.

If the user approaches at least one sample transfer container, in particular at least one pipette tip, inadvertently to one erroneous sample holder, in particular to the plane A or passes this plane and enters into the sample-holding chamber of the sample holder, with that sample holder not being selected as target for the next manual pipetting by the electronic control device and in particular illuminated, then the illumination type of the erroneous sample holder will be changed, in particular a warning light will be activated, which occurs preferentially via the light element associated with the erroneous sample holder. The warning light can provide an illumination with a defined signal color, e.g. “red”, a high intensity and/or a pulsation of the light intensity (blinking). Additionally or alternatively to a warning light an acoustical warning signal can be output by the electronic control device.

In case of a follow-up pipetting being envisioned according to the pipetting planning program, a tare function resp. a zeroing is provided for an already pre-filled sample holder. In this case, all lights are reset to the initial state, which is provided also for empty sample holders (e.g. deactivated lights and an optical highlighting of the first target/targets) Subsequently, with a repeated release being intended in the framework of the follow-up pipetting the target position(s) and the presence(s) of the tips of the sample transfer containers over one or several respective targets (i.e. the sample holder of the intended subsequent pipetting) are signaled, and the respective occupancy state is signaled after the release into the sample-holding chamber has occurred. (In the case of a secondary release into pre-filled sample holders additional output qualities can be utilized, in particular illumination types, e.g. color shades, in order to provide a greater clearness and/or security.

The sequence of processes and its correctness during the execution displayed via an output device resp. optically can be assigned to a coded sample-holding arrangement. To this aim, a sample-holding arrangement provides preferentially a code section, that identifies the individual sample-holding arrangement unambiguously. The information on the occupancy of the individual sample-holding arrangement can be stored in form of occupancy data in an electronic control device resp. in a data storage device; these can be components of the base apparatus, components of the pipette auxiliary system, or can be components of an external device, in particular of a computer or laboratory apparatus, in particular of the manually operable electrical pipetting apparatus, which is used by the user for the manual pipetting process. The transfer of the occupancy data to an external device can occur via a cable or wirelessly, in particular via a radio connection, in particular via a WLAN-connection or Bluetooth.

The output/the illumination at the sample-holding arrangement can occur, in each preferred embodiment of the invention, in dependence of the results of a process, selected for the processes described here with the denominations: diagnosis method, registration process, calibration method, individual calibration method, position test process, connection test process.

In the case of pipetting with a pipetting apparatus, that comprises an electronic control of the pipetting volume and a data storage device or that have established a connection to a data storage device, a logging of the released volumes can occur in the data storage device in form of pipetting release data. This pipetting release data and the occupancy data that can be acquired in dependence of the individual sample holder can be stored together resp. can be brought in conjunction with each other by an analysis method, in particular be compared with each other. With this, it is ascertained in particular in the case of coded sample-holding arrangements that, even to a later instant of time, a reliable declaration can be made on the volume that has been released or removed and on the residual volume that can be expected in the respective sample holder.

The external devices and the base apparatus can exchange data via e.g. cables or wirelessly among each other, in particular exchange, store and document data relating the information on the correctness of the planned and manually operated pipetting process.

In another preferred embodiment of the invention, the pipette auxiliary system is configured for the execution of the following function: the user moves a pipetting apparatus/a dispenser apparatus successively from sample holder(s) to sample holder(s). During this, the pipette auxiliary system detects, by means of the measurement arrangement, the approach of at least one sample transfer container, which is connected with the pipetting apparatus/dispenser apparatus to the at least one sample holder. Following the detection the pipetting apparatus/the dispenser apparatus releases autonomously each intended volume into the at least one sample holder, in particular without the user actuating the release button provided on the pipetting apparatus/the dispenser apparatus for the manually triggered release. To this aim, the pipette auxiliary system comprises preferentially a pipetting apparatus and/or a dispenser apparatus, that have established a data connection with the electronic control device—in particular: the base apparatus. The electronic control device is configured to forward the information on the occupancy state to the pipetting apparatus and/or a dispenser apparatus in form of occupancy state data as soon as the approach of the tip of the sample transfer container to a sample holder has been detected as a change of the occupancy state of the sample holder. Subsequently, the pipetting apparatus and/or the dispenser apparatus executes, in dependence of the occupancy state data, a pipetting stroke of the pipetting piston of the pipetting apparatus and/or the dispenser apparatus, preferentially corresponding to a certain pipetting volume that can be in particular individual for that sample holder. Then, the pipetting apparatus and/or the dispenser apparatus can output in particular an optical and/or acoustical signal to the user, with which the success of the automatic pipetting stroke is signaled. The this case, the filling of the sample holders would not even have to follow a certain sequence as the pipette auxiliary system, in particular the base apparatus, communicates via the data connection also the position of the sample holder (e.g. "B11") to the pipetting apparatus and/or the dispenser apparatus and the pipetting apparatus and/or the dispenser apparatus can assign the correct volume independently of the sequence. This could be of advantage in the case of a randomized assay, in order to avoid effects generated by unchanged pipetting scheme. Overall, the filling of plates would be significantly more comfortable and less error-prone.

The information that the sample transfer container sample transfer container is located in or at a certain sample holder transferred of the pipette auxiliary system resp. the base apparatus to the pipetting apparatus and/or the dispenser apparatus can be utilized in another preferred embodiment of the invention also for blocking the pipetting stroke of the pipetting apparatus and/or the dispenser apparatus. If the pipetting apparatus and/or the dispenser apparatus detects that the sample holder reported by the pipette auxiliary system resp. the base apparatus is not identical with the intended target position, i.e. the target-sample holder, then the release will be suppressed (function: release stop), in particular by inhibiting the release button, and a warning message will be output. By this, it is avoided that the user releases liquid into a wrong sample holder, even if he/she pushes the release button. This offers a great benefit in particular when valuable or unique samples are used. The electronic control device or another control device is configured preferentially to execute a pipetting planning program, according to which

- the information on each next at least one sample holder of the sample-holding arrangement intended as target position for pipetting is displayed to the user by means of the output device,
- the manually operated approach of at least one sample transfer container to the sample-holding arrangement and the recognition of the position of the reached sample holder is detected by means of the measurement arrangement,
- it is detected by comparison with the planning data of the pipetting planning program whether the reached position is the intended target position according to the plan,
- and, in case the reached position is the intended target position according to the plan, a predefined sample volume is released automatically to the target position,
- and, in case the reached position is not the intended target position according to the plan, this automatic release is suppressed.

In particular in the case of the randomized assay, it is sensible to use the release stop, which is activated if the user attempts to release a sample for a second time over the same first sample holder into which a sample has been released previously in the course of the randomized sequence. Possibly, the user does not know any more, which sample holder has already been filled by him/her with liquid.

The base apparatus is preferentially a table-top device, onto which the sample-holding arrangement is placed and/or plugged to establish the working position. With this, the electrical contact between the contact sites of the base apparatus and the contact sites of the sample-holding arrangement is established if necessary; in the case of an optical signal transmission of the sensor device, an optical coupling between the coupling sites of the base apparatus and the coupling sites of the sample-holding arrangement is established analog.

The base apparatus comprises preferentially a positioning range over which the positioning space for accepting the sample-holding arrangement is located. The positioning range can comprise a planar plane in which preferentially the output are provided, in particular the light arrangement and in particular a matrix of contact sites or coupling sites, in order to connect in the working position the measurement arrangement with the electronic control device. Also the measurement elements, in particular the electrodes in the case of a capacitance measurement, can be arranged in such a way at the positioning space, in particular in contact with the positioning space, that they reach only along a fraction f of the entire height of the positioning space into that or that they preferentially do not reach into the positioning space. By this, the arrangement of the measurement elements will be compact and robust, and also the sample-holding arrangement will be easier to construct.

The base apparatus, in particular the electronic control device, can also be able to network or be networked via a data connection with other laboratory apparatus, such as e.g. an electronic pipetting apparatus or a computer, in particular in order to transmit the information on the occupancy state of the individual sample holders.

The base apparatus, in particular the electronic control device, can also be a component of a laboratory apparatus into which the pipette auxiliary system for supporting the manual pipetting is integrated partially in this case. Whereas in the process of the automatic pipetting no manual pipetting auxiliary in necessary, it is conceivable that the manual filling and pipetting is desired occasionally in the case of an automated laboratory machine. In this case, the pipette auxiliary device resp. the base apparatus can also be a component of an automated laboratory machine. This automated laboratory machine can be configured to store and/or to process and/or to forward the information on the occupancy states that have been registered by means of the measurement arrangement as data.

The base apparatus comprises preferentially the output device resp. the light arrangement.

Preferentially, the pipette auxiliary system comprises at least one first and one second base apparatus, in particular at least two base apparatus designed according to the present invention. Preferentially, the pipette auxiliary system comprises at least two measurement arrangements. Preferentially, a first measurement arrangement is assigned to a first base apparatus and a second measurement arrangement is assigned to a second base apparatus. Preferentially the pipette auxiliary system comprises at least two output devices. Preferentially, a first output device is assigned to the first base apparatus and a second output device is assigned to a second base apparatus.

Preferentially, the control device is configured to address the first measurement arrangement, the second measurement arrangement, the first output device and/or the second output device.

Preferentially, the control device is configured to detect—by controlling the first measurement arrangement in the working position—the first occupancy state of at least one sample holder arranged at the first base apparatus, and to output to the user the information on the first occupancy state of the at least one sample holder in dependence of its first occupancy state, preferentially by controlling the first output device.

Preferentially, the control device is configured to output, in dependence of the first occupancy state measured at the first base apparatus, to the user an information about the target position to be pipetted at the second base apparatus. This serves in particular the purpose of offering the user assistance for the transferring of sample from one first sample-holding arrangement (e.g. microtiter plate) into a second sample-holding arrangement (e.g. microtiter plate).

Preferentially, the control device is configured to detect the second occupancy state of at least one sample holder arranged at the second base apparatus by controlling the second measurement arrangement in the working position, and output to the user in dependence of the second occupancy state of the least one sample holder the information on its second occupancy state by controlling the second output device.

A sample-holding arrangement is preferentially a microtiter plate (well-plate) that can be produced, in particular in the case of the second preferred embodiment of the invention, according to at least one SLAS-standard. In this, the microtiter plate can be configured in particular according to one or several or according to every of the following industry standards: ANSI SLAS 1-2004 (R2012) (Footprint Dimensions last updated Jan. 9, 2004); ANSI SLAS 2-2004 (R2012) (Height Dimensions, last updated Jan. 9, 2004); ANSI SLAS 3-2004 (R2012) (Bottom Outside Flange Dimensions, last updated Jan. 9, 2004); ANSI SLAS 4-2004 (R2012) (Well Positions, last updated Jan. 9, 2004); ANSI SLAS 6-2012 (Well Bottom Elevation). A sample-holding arrangement is preferentially a fixed composite of a plurality of sample holders. The sample holders can be connected through a connection plate or through connection bridges. The sample holders can be containers that are opened upwards. The sample holders can be arranged in a grid arrangement of typically 12, 48, 96, 384 or more sample holders. In this, for example the rows and columns of the sample holders are aligned perpendicularly to each other, in particular in the known geometries of 3×4, 6×8, 8×12, 16×24. The measurement elements and/or the light elements are provided preferentially in the same arrangement, or in an arrangement, which is adjusted to the geometry of the sample holder.

A sample-holding arrangement is preferentially a coherent, in particular an integrally formed element.

A sample holder can be a holder for a sample container, with the sample container being possibly a single-container or a multi-container. A sample-holding arrangement can be a holding frame with openings resp. cavities or be without openings or cavities, that can be designed each for accepting a single container or a cup (a well) of a microtiter plate. In particular one or two measurement elements can be arranged in the working position at an opening each, in particular, by connecting them tightly with the holding frame.

The pipetting apparatus is preferentially a handheld apparatus. To this aim, it comprises preferentially a grip section. Preferentially, the base body is designed as the grip section, which is grasped by the hand of the user for holding the pipetting apparatus, and in particular for moving and operating it. Preferentially, the pipetting apparatus is designed for a single-handed operation, so that all processes necessary for the pipetting can be executed single-handedly. In particular hand-powered pipettes are counted among the pipetting apparatus. Furthermore, one distinguishes between single channel devices and multichannel devices, with the single channel devices comprising only one single release channel and the multi channel devices comprising several release channels, that allow for in particular the parallel release/up-take of the sample.

The invention can also be utilized analog in combination with a dispenser apparatus, even if individual passages of this description refer only to the pipetting apparatus. A dispenser usually comprises a fluid transfer container with a larger maximum receiving volume than a pipette and serves the user by allowing him/her to execute a plurality of release steps without having to refill the fluid transfer container oftentimes. In the case of the dispenser, the extrusion piston responsible for the aspiration/release is located in the fluid transfer container, namely in the dispenser tip.

Examples for hand-powered pipettes are the Eppendorf Reference® 2 and the Eppendorf Research® plus of the Eppendorf AG, Hamburg, Germany; an example of a hand-powered dispenser is the Multipette® M4 of the Eppendorf AG; examples for electronic pipettes are the Eppendorf Xplorer® and Eppendorf Xplorer® plus of the Eppendorf AG; examples for electronic dispensers are the Multipette® E3 and E3x of the Eppendorf AG.

The base body of the pipetting apparatus comprises preferentially a case, in which the moving device can be arranged at least partially or completely. Preferentially, the control device is arranged at least partially or completely in the base body.

The moving device serves for the moving the fluid for the transfer and serves in particular for up-taking the fluid in the container and for releasing the fluid from the container. In a hand powered moving device, said moving device comprises preferentially an actuation element in particular an operation button, and its actuation by the user provides the force for moving the fluid. In the case of an electrically powered moving device, the force for moving the moving device is applied by means of an electrical energy source that can in particular a battery or an accumulator and that can be a component of the pipetting apparatus, in particular of the base body. The moving device comprises preferentially a piston device with a piston, which is movable in a cylinder of the piston device for generating a partial vacuum in this cylinder. The moving device can also be designed for moving a piston, which is only partially or not at all a component of the pipetting apparatus, as it is the case e.g. for the movement of the piston of a syringe container.

Preferentially, the pipetting apparatus and/or the pipette auxiliary system comprise at least one communication device and/or one user interface, in particular an operation element that serves for in particular the input- and/or output of information between the user and the control device. The operation element can comprise at least one operation button or keyboard, at least one display, in particular a touchscreen and/or at least one loudspeaker.

The positioning device is configured to effectuate a reliable relative positioning of the sample-holding arrangement and the base apparatus, so that the other components of the system, in particular the measurement elements and/or the light arrangement, adopt only one unique relative position each with respect to the sample-holding arrangement and the base apparatus. By this, the precision during the handling of the pipette auxiliary system is improved. The positioning device can comprise one or several support sections that are provided at the base apparatus for supporting, holding or hanging the sample-holding arrangement. A support section can be a carrier section, in particular a plate section onto which the sample-holding arrangement is rested. With at least one, two, three or four additional support sections the sample-holding arrangement can be positioned unambiguously and free of play in lateral direction. These support sections can be realized by barrier elements serving as stops with their position being coordinated precisely with the outer dimensions of the sample-holding arrangement. The positioning device can comprise at least one position sensor, with which the manual placement of the sample-holding arrangement in the positioning space can be registered by the electronic control device of the base apparatus.

The invention relates furthermore to the base apparatus, as described in relation to the pipette auxiliary system according to the present invention and according to the first, second, and third preferred embodiment of the invention, for supporting the manual pipetting of a plurality of samples in a working position of a sample-holding arrangement, as it has been described in particular in relation to the pipette auxiliary system according to the present invention. The base apparatus comprises:

- a positioning device, which is configured for positioning a preferred embodiment of the sample-holding arrangement according to the present invention in the working position inside a positioning space of the base apparatus, which is opened at least along one plane for pipetting,
- preferentially a light arrangement located in the working position underneath that plane, with which the sample-holding arrangement can be illuminated in dependence of the occupancy state, that has been measured by means of the measurement elements of a preferred embodiment of the pipette auxiliary system according to the present invention, in particular a sample-holding arrangement according to the present invention.

The invention relates furthermore to a sample-holding arrangement, as described in relation to the pipette auxiliary system according to the present invention and according to the first, second or third preferred embodiment of the invention, for supporting the manual pipetting of a plurality of samples in a working position of the sample-holding arrangement, which is provided for the positioning in the positioning device of a base apparatus in particular according to the present invention, with sample-holding arrangement comprising:

- a plurality of sample holders,
- a measurement arrangement comprising a plurality of measurement elements which are positioned at least in the working position underneath this plane and using which the occupancy state of at least one sample holder can be detected in the working position.

Furthermore, the invention relates to a method for the measurement of an occupancy state of a sample holder by means of a pipette auxiliary system according to the present invention. Further preferred aspects of this process can be found in the present description of the invention. The process comprises in particular the steps of measuring the occupancy state by measuring a capacitance or its change by means of at least one measurement element implemented as an electrode, when a conductive sample transfer container or a sample transfer container of a non-conductive material, filled with a conductive sample, is approached to this electrode and in particular contacts the plane or passes the plane.

Furthermore, the invention relates to a production method for the production of a sample-holding arrangement according to the invention by means of an injection molding technique, in particular the realization of at least one electrical conductor or one electrode or one electrical contact site of the sample-holding arrangement by means of a conductive polymer.

Other preferred embodiments of the pipette auxiliary system according to the present invention, the base apparatus according to the present invention, the sample-holding arrangement according to the present invention and the process according to the present invention and other aspects of the invention unfold from the following description of the embodiment examples in relation with the figures. Equal labels denote essentially equal elements.

In the figures:

FIG. 1*a* depicts in a perspective lateral view an application scene underlying the invention, in which a complete filling by means of successive column-wise pipetting is executed on a 96 well microtiter plate with a manually operated multi-channel pipette.

Figure 1B:
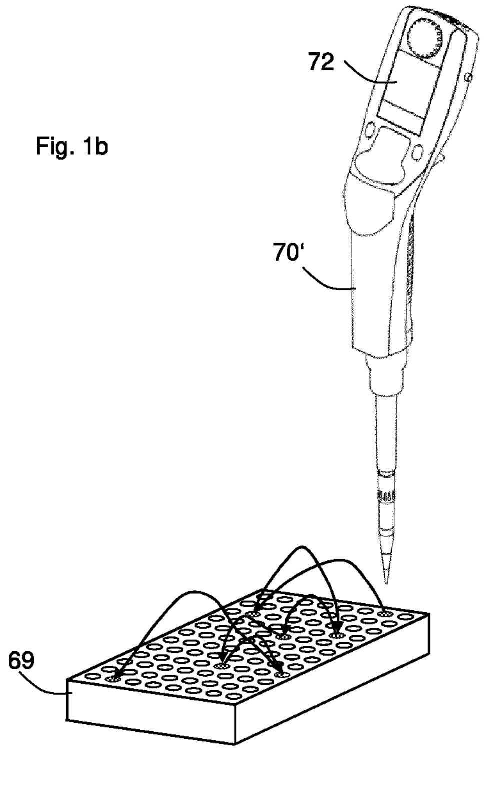

FIG. 1*b* depicts in a perspective lateral view an application scene underlying the invention, in which a complete filling by means of randomized pipetting is executed on a 96 well microtiter plate with a manually operated single channel pipette.

Figure 2A:
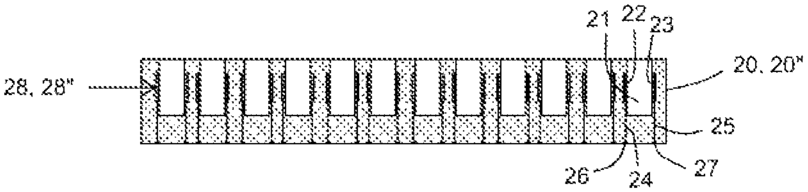

FIG. 2*a* depicts a sample-holding arrangement according to the preferred embodiment of the invention in an exemplary embodiment as preferred component of an exemplary embodiment of the pipette auxiliary system according to the present invention.

Figure 2B:
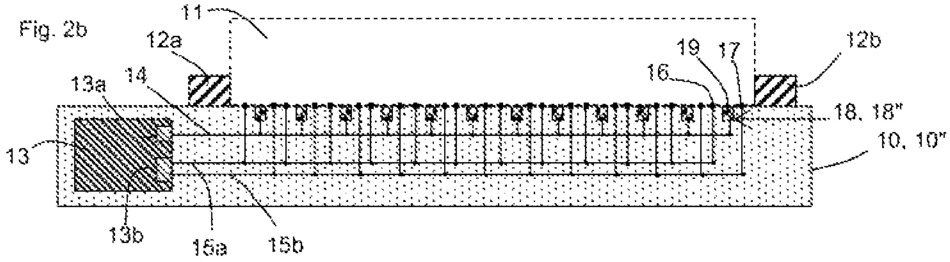

FIG. 2*b* depicts a base apparatus according to the first preferred embodiment of the invention in an exemplary embodiment as preferred component of an exemplary embodiment of the pipette auxiliary system according to the present invention, that can in particular be utilized with the sample-holding arrangement in FIG. 2*a*.

Figure 2C:
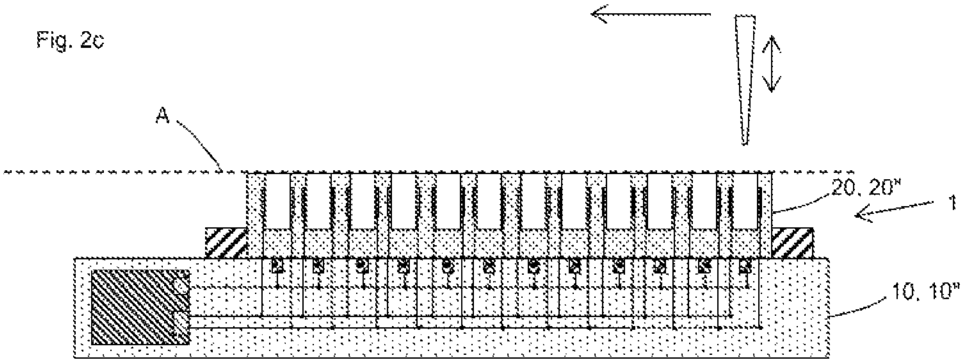

FIG. 2*c* depicts a pipette auxiliary system, in working position, comprising the sample-holding arrangement from FIG. 2*a* and the base apparatus from FIG. 2*b*.

Figure 3A:
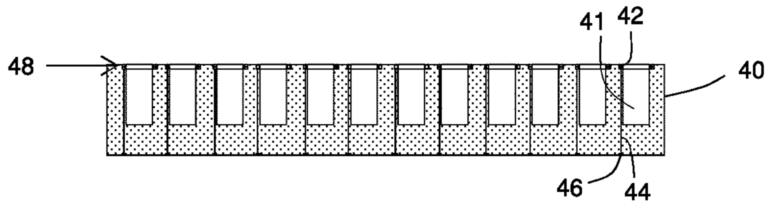

FIG. 3*a* depicts a sample-holding arrangement according to a further embodiment example of the invention, as preferred component of an exemplary pipette auxiliary system according to the present invention.

Figure 3B:
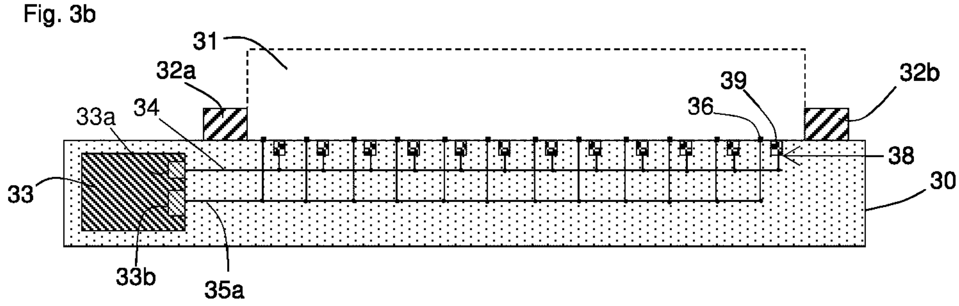

FIG. 3*b* depicts a base apparatus according to a further embodiment example of the invention, as preferred component of an exemplary pipette auxiliary system according to the present invention, in particular utilizable with the sample-holding arrangement from FIG. 3*a*.

Figure 3C:
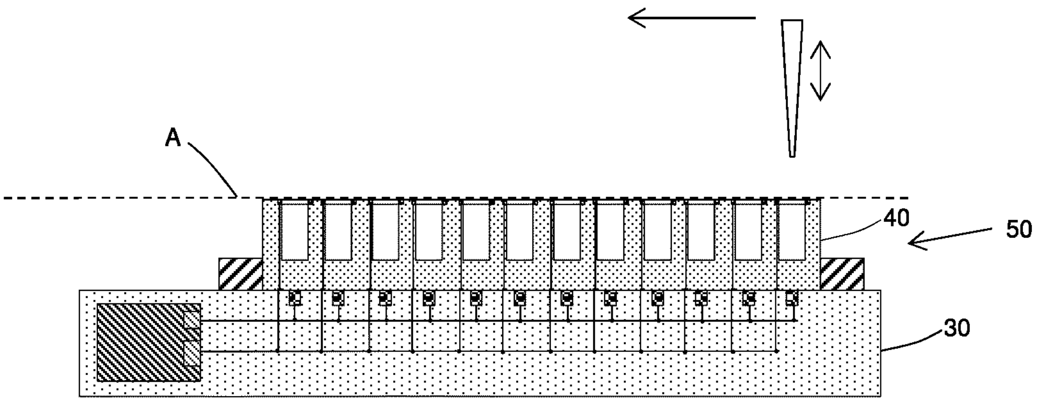
Figure 4A:
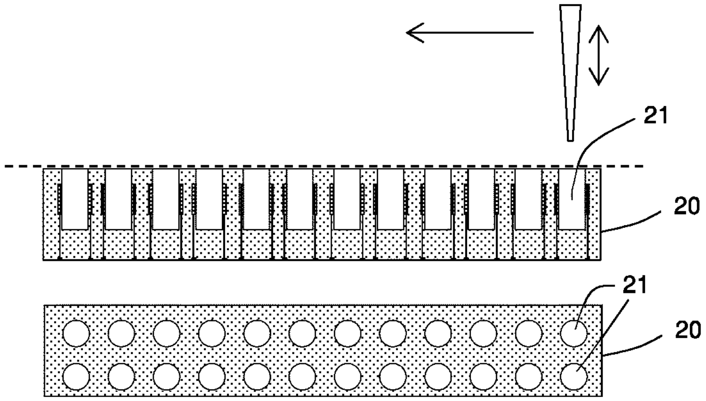
Figure 4B:
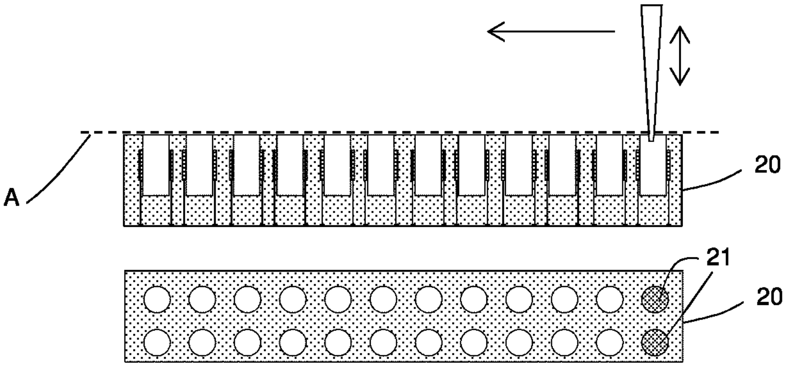
Figure 4C:
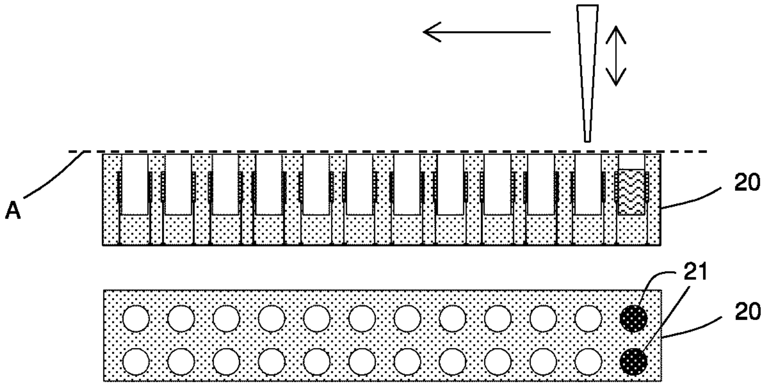
Figure 4D:
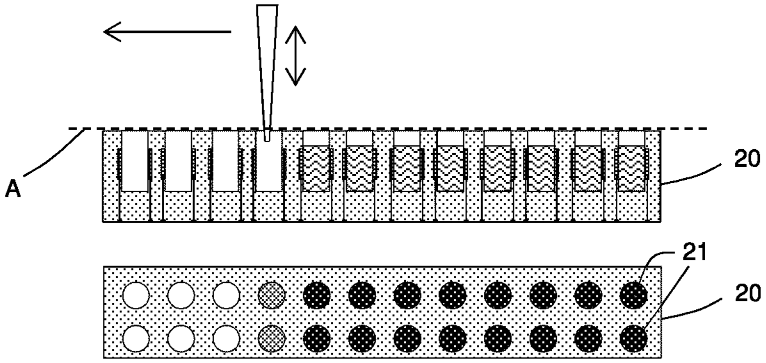

FIG. 3*c* depicts a pipette auxiliary system, in working position, comprising the sample-holding arrangement from FIG. 3*a* and the base apparatus from FIG. 3*b*.

FIG. 4*a* through FIG. 4*d* depict each different phases of the pipetting supported by an exemplary pipette auxiliary system according to the present invention on a sample-holding arrangement, and depict the optical highlighting of the pipetted sample holders resp. the sample holders to be pipetted by an illumination program effectuated by the pipette auxiliary apparatus.

Figure 5A:
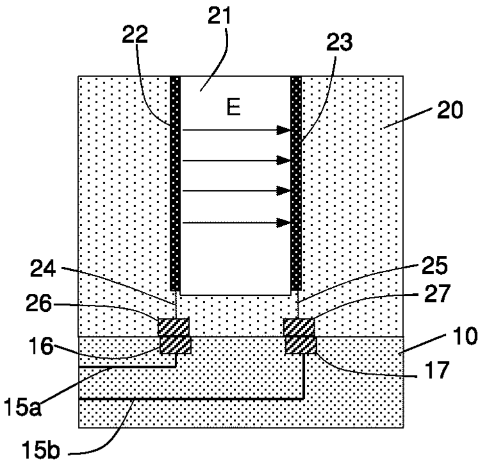
Figure 5B:
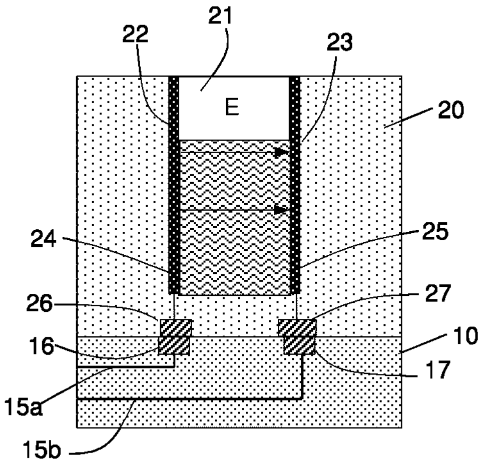

FIGS. 5*a* and 5*b* depict a simplified lateral cross sectional view through a capacitance measuring—by means of two cylinder-barrel-shaped electrodes—sensor device of an exemplary pipette auxiliary system, in the empty and filled state of the only displayed sample holder.

Figure 5C:
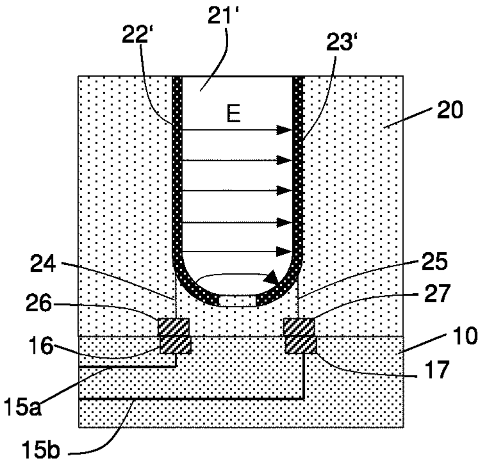
Figure 5D:
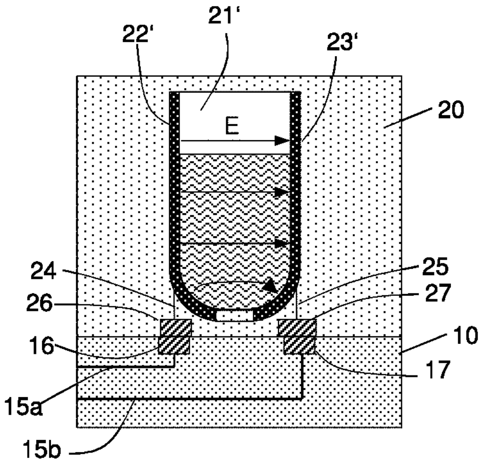

FIGS. 5*c* and 5*d* depict a simplified lateral cross sectional view through a capacitance measuring—by means of two cylinder-barrel-shaped electrodes with a round bottom—sensor device of an exemplary pipette auxiliary system, in the empty and filled state of the only displayed sample holder.

Figure 5E:
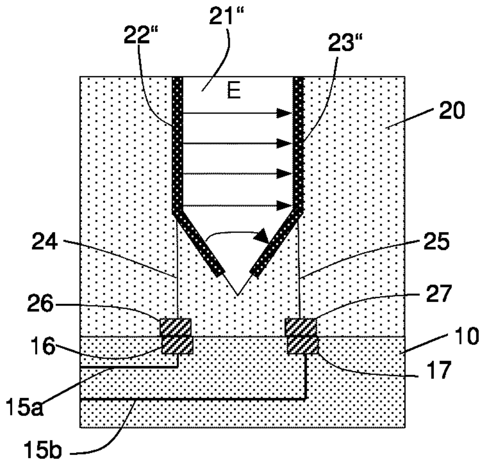
Figure 5F:
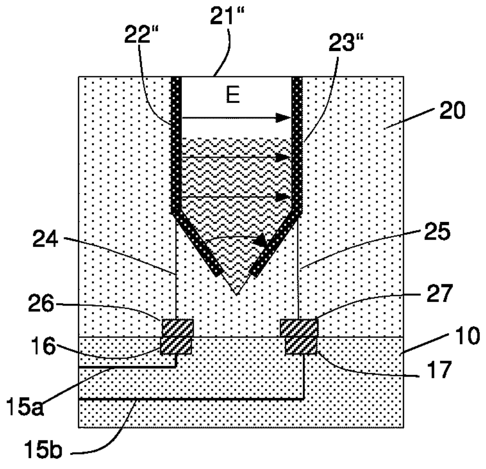

FIGS. 5*e* and 5*f* depict a simplified lateral cross sectional view through a capacitance measuring—by means of two cylinder-barrel-shaped electrodes with a conical bottom—sensor device of an exemplary pipette auxiliary system, in the empty and filled state of the only displayed sample holder.

Figure 6A:
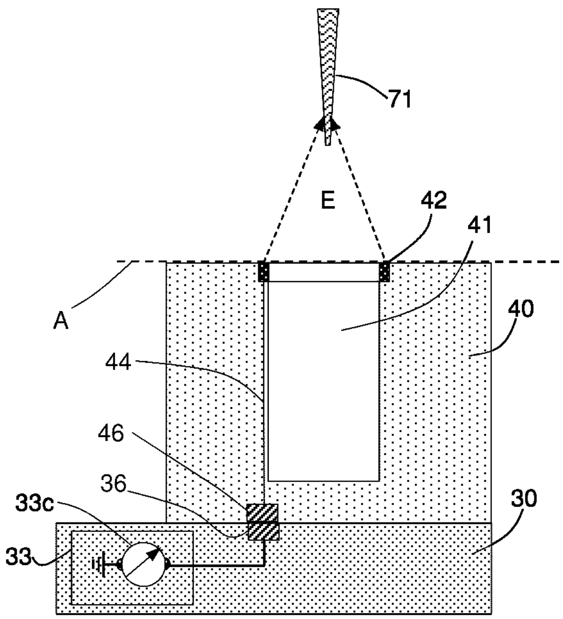
Figure 6B:
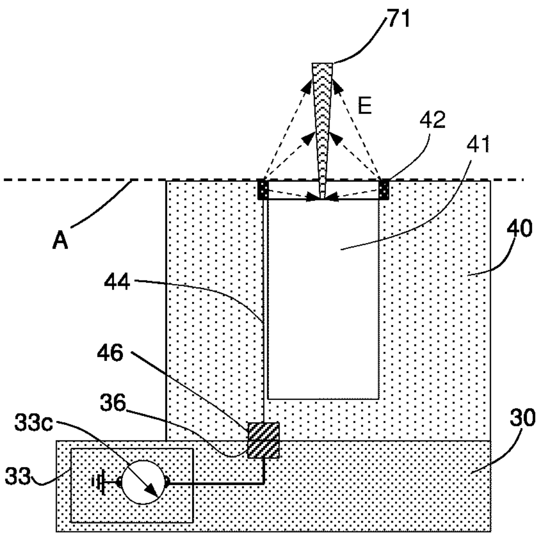

FIGS. 6*a* and 6*b* depict a simplified lateral cross sectional view through a capacitance measuring sensor device of another exemplary pipette auxiliary system, in the empty and filled state of the only displayed sample holder.

Figure 7A:
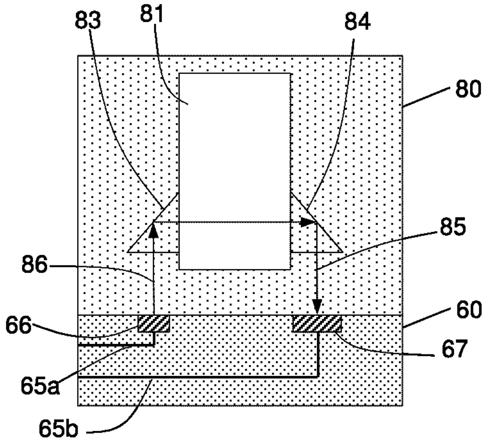
Figure 7B:
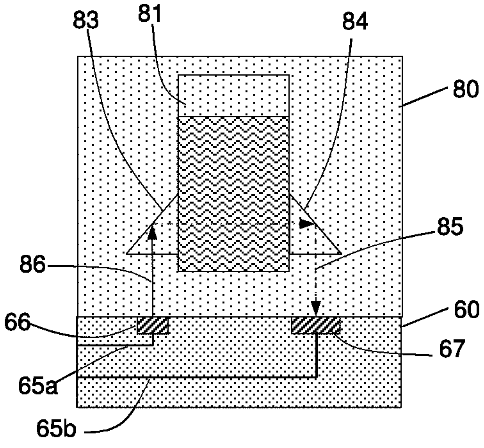

FIGS. 7*a* and 7*b* depict a simplified lateral cross sectional view through an optically measuring—by means of two optical measurement elements—sensor device of another exemplary pipette auxiliary system, in the empty and filled state of the only displayed sample holder.

Figure 8A:
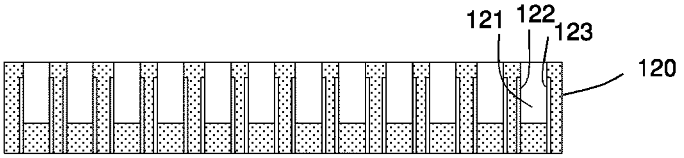

FIG. 8*a* depicts a sample-holding arrangement according to the second preferred embodiment of the invention in an exemplary embodiment as preferred component of an exemplary embodiment of the pipette auxiliary system according to the present invention.

Figure 8B:
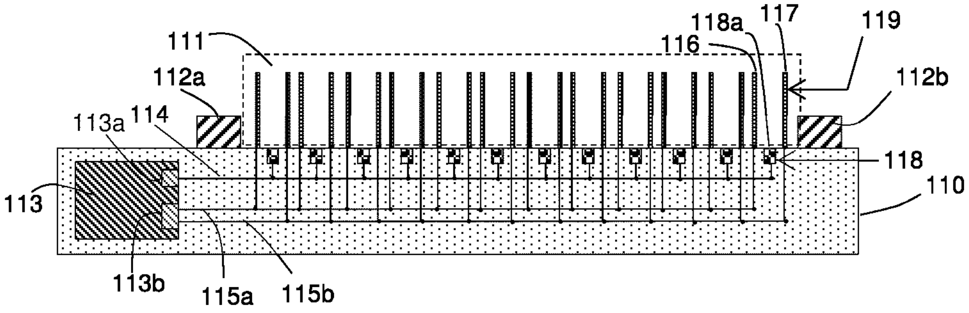

FIG. 8*b* depicts a base apparatus according to the second preferred embodiment of the invention in an exemplary embodiment as preferred component of an exemplary embodiment of the pipette auxiliary system according to the present invention, that can in particular be utilized with the sample-holding arrangement in FIG. 8*a*.

Figure 8C:
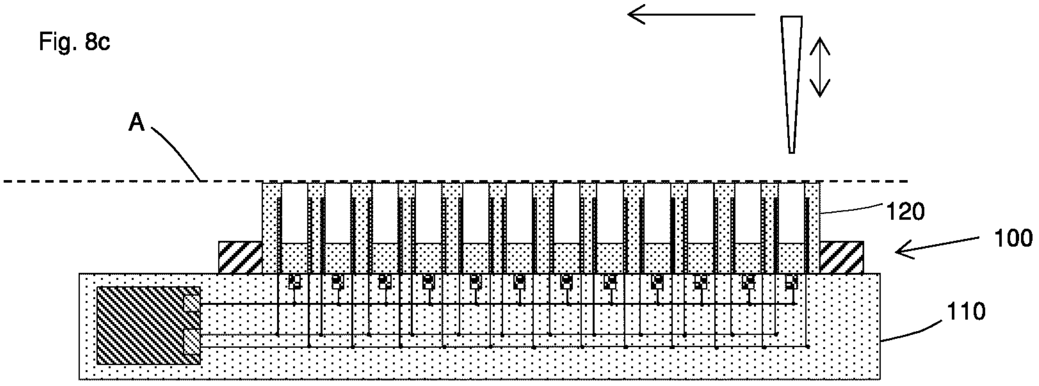

FIG. 8*c* depicts a pipette auxiliary system, in working position, comprising the sample-holding arrangement from FIG. 8*a* and the base apparatus from FIG. 8*b*.

Figure 9A:
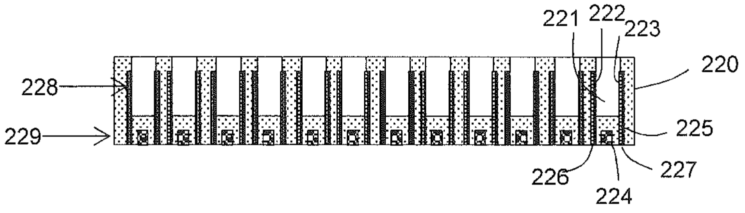

FIG. 9*a* depicts a sample-holding arrangement according to the third preferred embodiment of the invention in an exemplary embodiment as preferred component of an exemplary embodiment of the pipette auxiliary system according to the present invention.

Figure 9B:
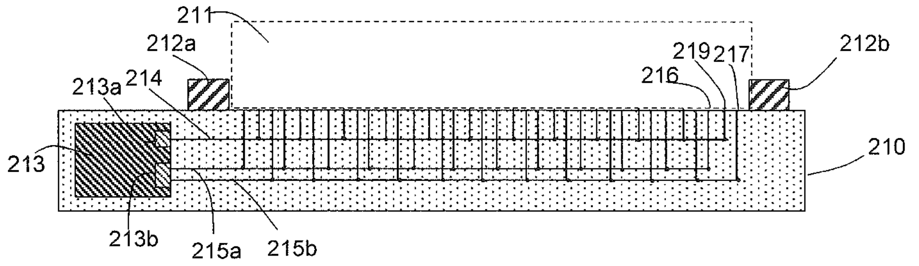

FIG. 9*b* depicts a base apparatus according to the third preferred embodiment of the invention in an exemplary embodiment as preferred component of an exemplary embodiment of the pipette auxiliary system according to the present invention, that can in particular be utilized with the sample-holding arrangement in FIG. 9*a*.

Figure 9C:
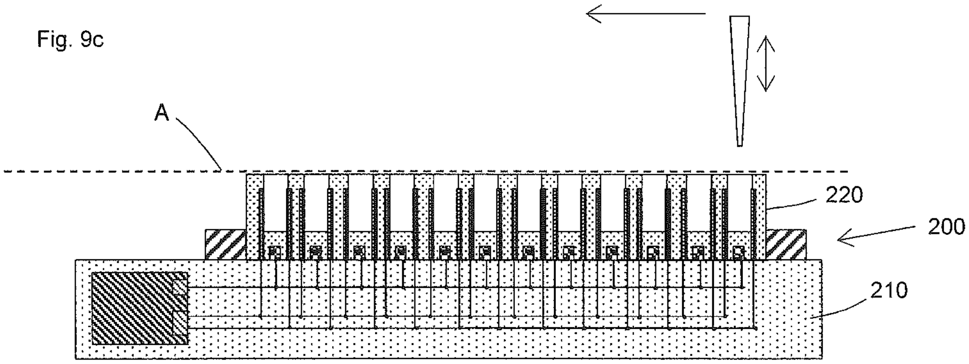

FIG. 9*c* depicts a pipette auxiliary system, in working position, comprising the sample-holding arrangement from FIG. 9*a* and the base apparatus from FIG. 9*b*.

Figure 10A:
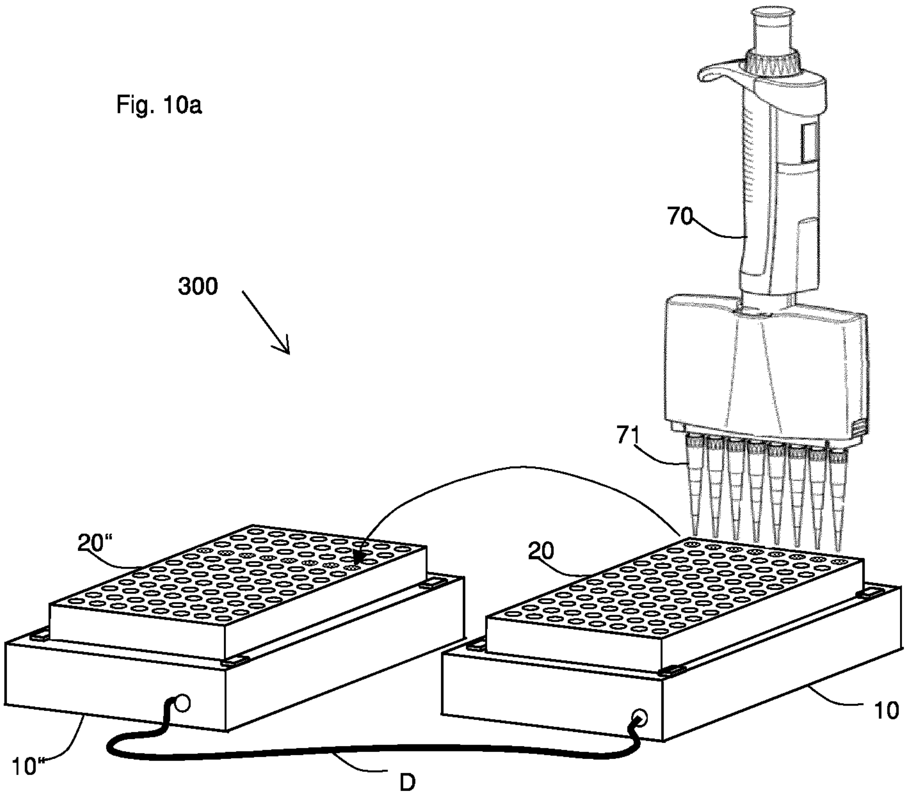

FIG. 10*a* depicts a perspective view of a pipetting system according to the present invention according to another preferred embodiment.

Figure 10B:
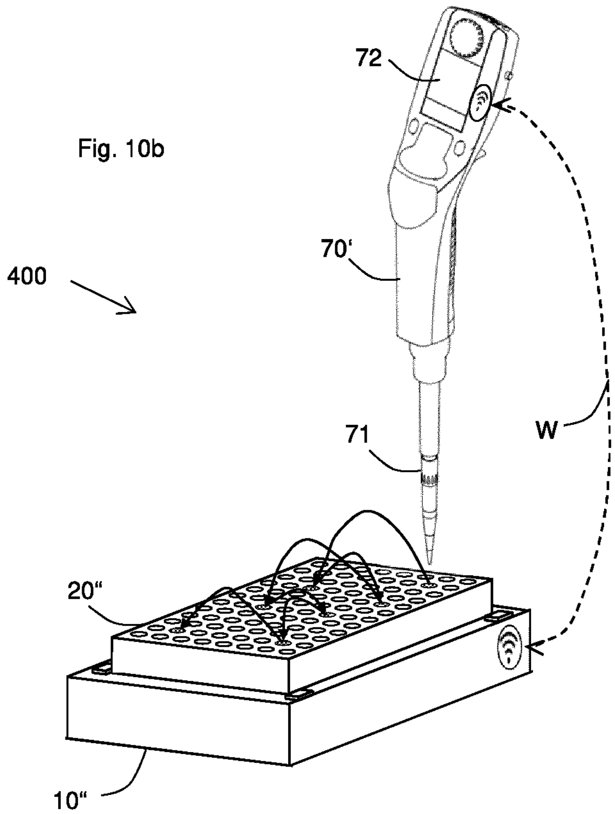

FIG. 10*b* depicts a perspective view of a pipetting system according to the present invention according to another preferred embodiment.

Figure 11A:
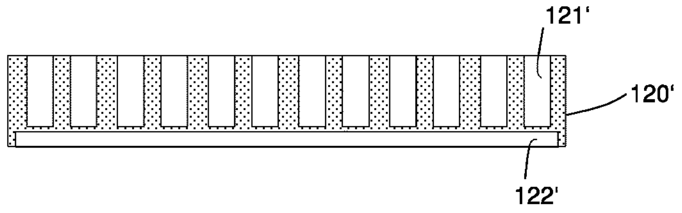

FIG. 11*a* depicts a sample-holding arrangement according to the second preferred embodiment of the invention in an exemplary embodiment as preferred component of an exemplary embodiment of the pipette auxiliary system according to the present invention.

Figure 11B:
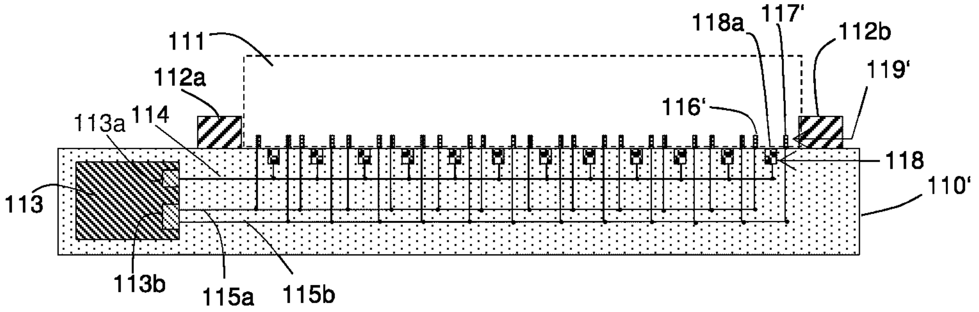

FIG. 11*b* depicts a base apparatus according to the second preferred embodiment of the invention in an exemplary embodiment as preferred component of an exemplary embodiment of the pipette auxiliary system according to the present invention, that can in particular be utilized with the sample-holding arrangement in FIG. 11*a*.

Figure 11C:
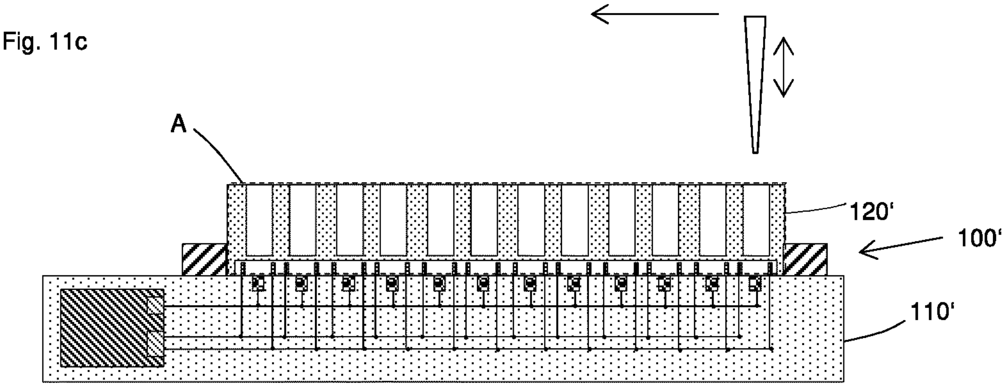

FIG. 11*c* depicts a pipette auxiliary system, in working position, comprising the sample-holding arrangement from FIG. 11*a* and the base apparatus from FIG. 11*b*.

Figure 12A:
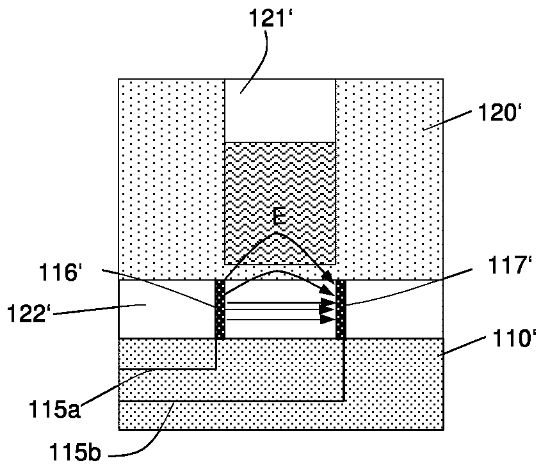

FIG. 12*a* depicts a simplified lateral cross sectional view through a capacitance measuring—by means of two plate-shaped electrodes—sensor device of an exemplary pipette auxiliary system, in the filled state of the single displayed sample holder, with the sensor device corresponding to the sensor devices depicted in FIGS. 11*b* and 11*c*.

Figure 12B:
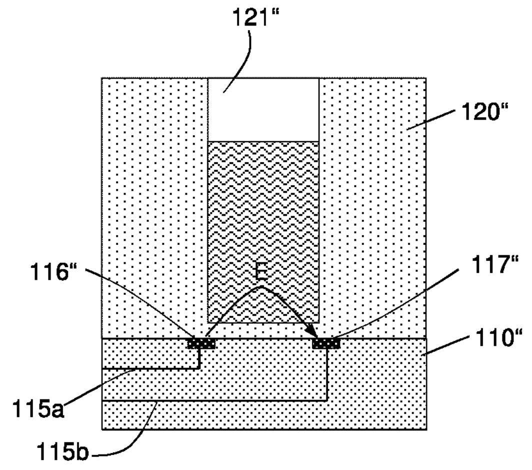

FIG. 12*b* depicts a simplified lateral cross sectional view through a capacitance measuring—by means of two plate-shaped electrodes—sensor device of an exemplary pipette auxiliary system, in the filled state of the single displayed sample holder.

Figure 12C:
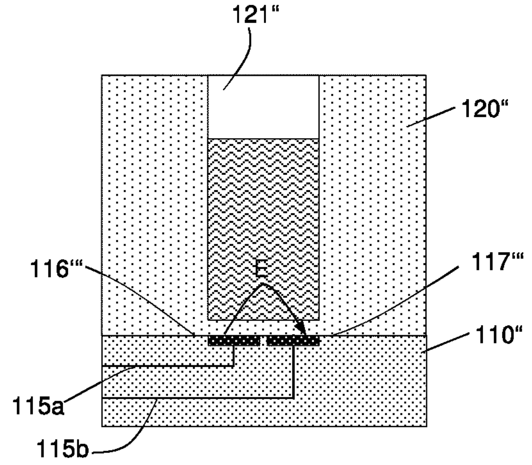

FIG. 12*c* depicts a simplified lateral cross sectional view through a capacitance measuring—by means of two plate-shaped electrodes—sensor device of an exemplary pipette auxiliary system, in the filled state of the single displayed sample holder.

FIG. 1*a* depicts a typical application scene underlying the invention. At a 96 well plate 69, a complete filling of the well plate is executed with a manually operated multichannel pipette 70 by means of a successive, column-wise pipetting in direction F. Eight pipette tips 71 correspond to the number and the pattern of a column of 8 wells of the 96 well plate. In the example the pipette tips 71 are successively refilled anew in order to fill all sample holders of the microtiter plate by successive pipetting. The pipetting requires the positioning of the pipette 70 over the target column of the wells of the well plate, the lowering along the vertical direction V and the correct insertion of the pipette tips 71 into the openings of the wells, the continued lowering into the wells and the release of the sample by pipetting. This is followed by the lifting of the pipette from the lowered position and the movement forward along the direction F by exactly one distance between the columns. Above the second column the described processes are repeated correspondingly, equally for the columns number 3 through 12.

If the user, during the successive filling, fills for example the fifth column by manual pipetting and does not bear that in mind, there is a high likelihood of either not filling in the following pipetting step the next intended target column, e.g. column six, or of inadvertently filling for a second time one of the columns one through five with already filled sample holders. With this invention a pipette auxiliary system is described that guides the user faultlessly in such situations by measuring the occupancy and optical marking.

FIG. 1*b* depicts a scenario, in which the user has to fill a well plate 69 by means of an electrical single channel pipette 70'. In this figure, the task for the user consists in reliably following a pipetting plan on the well plate that involves the pipetting at individual containers according to a non-successive proceeding. In particular the coordinates of the sample containers to be filled or of the sample containers, from which a sample is intended to be removed and e.g. transferred by pipetting, can be known to the user. In particular in this constellation a substantial effort is required from the user for pipetting at the correct well. This becomes even more difficult in the case of a sample plate with more than 96 well, e.g. 384 wells. In the described scenarios, the invention offers a very beneficial solution.

FIG. 2*a* depicts a sample-holding arrangement 20, 20" according to the first preferred embodiment of the invention in an exemplary embodiment as preferred component of an exemplary embodiment of the pipette auxiliary system according to the present invention. The sample-holding arrangement 20, 20" has the format of a well plate produced according to the SBS-standard. The sample-holding arrangement 20, 20" is produced essentially of transparent plastic by means of a two shot molding and exhibits a matrix of 96 sample holders 21 (wells). Here, out of those, a row with 12 sample holders 21 is depicted in a cross section.

The sample-holding arrangement 20, 20" exhibits a measurement arrangement 28, 28" with a plurality of measurement elements, here e.g. 192 measurement elements, of which a pair 22, 23 of measurement elements implemented as electrodes is positioned so that they each embed the sample-holding chamber of the sample holder 21 like a dielectric between capacitor plates. In FIG. 2*c*, the working position is depicted with the pipette tips 71 pipetting in order to successively fill the complete well plate 20, 20". From this it results that the measurement elements 22, 23 of the measurement arrangement 28, 28" are arranged, at least in the working position, underneath the plane A with the occupancy state of at least one sample holder 21 in the working position being detectable with one pair 22, 23 of electrodes. The electrodes and the conductors are formed from a conductive polymer, equally the contact sites 26 and 27 of the sample-holding arrangement 20, 20" that are connected electrically with the conductor paths 24 and 25, which in turn are connected electrically with the electrodes 22, 23.

FIG. 2*b* depicts a base apparatus 10, 10" according to the first preferred embodiment of the invention in an exemplary embodiment as preferred component of an exemplary embodiment of the pipette auxiliary system according to the present invention, that can in particular be utilized with the sample-holding arrangement 20, 20" in FIG. 2*a*. The base apparatus 10, 10" comprises: a positioning device exhibiting several barrier elements 12*a*, 12*b*, that are configured for the positioning of the sample-holding arrangement in the working position inside a positioning space 11 of the base apparatus, which is opened for pipetting at least along a plane A.

The base apparatus 10, 10" comprises a light arrangement 18, 18", which is arranged in the working position underneath that plane A with which the sample holders of the sample-holding arrangement 20, 20" can be illuminated in dependence of each measured occupancy state that have been measured by means of the measurement elements 22, 23 of the sample-holding arrangement 20, 20".

The light elements 19, each implemented in the for of LEDs, can be addressed individually by the electric control device 13 via the conductors of a conductor bundle 14. The light elements are coupled electrically with the control device via the electrical interface 13*a*.

The base apparatus comprises preferentially a solid case, fabricated of metal and/or plastic, in which the light arrangement and the control device are arranged. The measurement elements 22, 23 of the microtiter plate 20, 20" are connected electrically via electrical contact sites 26, 27 with the corresponding contact sites 16, 17 that are located on the top side of the plate-like positioning range of the base apparatus 10 in the positioning space 11. The contact sites 16, 17 are each connected via the conductors 15*a*, 15*b* with an electrical interface 13*b*, with which the measurement elements are coupled to the control device 13. All first measurement electrodes 22 of the sensor devices of the row of sample holders 21 depicted here are connected here with the conductor 15*a*, all second measurement electrodes 23 of the sensor devices of the row of sample holders 21 depicted here are connected here with the conductor 15*b*. Because of the sensitive measurement electronics for the measurement of very small capacitances, with this design that minimizes the conductor length, reliable measurements of the occupancy state can be carried out successively at all sensor devices of the row, in which 8 sensor devices are measured simultaneously for each column.

The well plate 20, 20' is positioned reliably in the positioning space 11 by means of the positioning device 12*a*, 12*b*.

FIG. 2*c* depicts a pipette auxiliary system, in working position, comprising the sample-holding arrangement from FIG. 2*a* and the base apparatus from FIG. 2*b*. The pipette auxiliary system 1 serves for supporting the manual pipetting of a plurality of samples in a working position of a sample-holding arrangement 20, 20", with the pipette auxiliary system 1 comprising: a base apparatus 10, 10" with a positioning device 12*a*, 12*b*, which is configured for the positioning of the sample-holding arrangement 20, 20" in the working position inside a positioning space 11 of the base apparatus 10, 10", which is opened for pipetting at least along a plane (A), the sample-holding arrangement 20, 20" that comprises a plurality of sample holders 21, a measurement arrangement 28, 28" with a plurality of measurement elements 22, 23 that are arrange at least in the working position underneath that plane A and with which the occupancy state of at least one sample holder 21 in the working position can be detected, and a light arrangement 18, 18" that is arranged at least in the working position underneath that plane A with which the sample-holding arrangement 20, 20" resp. its sample holders 21 can be illuminated in dependence of each measured occupancy states of that at least one sample holder 21.

In the first preferred embodiment of the invention depicted in FIG. 2*c*, a plurality of measurement elements 22, 23 is a fixed component of the sample-holding arrangement 20, 20" and the light arrangement 18, 18" is a fixed component of the base apparatus 10, 10".

FIG. 3*a* depicts a sample-holding arrangement according to another embodiment example of the invention, as preferred component of an exemplary pipette auxiliary system according to the present invention. Here, the sample-holding arrangement 40 comprises at each upper edge of a sample holder a single ring electrode 42 whose function will be discussed with the help of FIGS. 6*a* and *b*. Correspondingly, fewer conductors 44 and contact sites 46 at the sample-holding arrangement are provided here than in the embodiment according to FIG. 2*a*, and as compared to the embodiment according to FIG. 2*b* fewer conductors 35*a*, and contacts 36. Beyond that, the working principle of the pipette auxiliary systems from FIGS. 2*a*-*c* and 3*a*-*c* is similar.

The single electrode in the upper section of the sample holder according to FIGS. 3*a* and 6*a* is particularly preferred, and can also be combined with the version from FIG. 2*a* and FIG. 5*a*/5*c*, in which pairs of electrodes are stretched along most of the length of the sample holders in vertical direction. Functionally, this renders it possible to obtain with a single pipette auxiliary system an information on whether and when a pipette tip is approaching the measurement chamber and which occupancy state with a liquid sample has the sample holder in its sample holding chamber.

FIG. 4*a* through FIG. 4*d* each depict different phases of the pipetting at a sample-holding arrangement 20 supported by means of an exemplary pipette auxiliary apparatus 1 according to the present invention, and depict the optical highlighting of the pipetted resp. to be pipetted sample holders effectuated by an illumination program of the pipette auxiliary apparatus. When a pipette tip is lowered through the plane A (FIG. 4*b*) the sample holder is illuminated for example from below with a yellow color, which is symbolized here by a lighter shading of the sample holders located at the far right. The sample holders that have been filled are illuminated from below in a green light, which is symbolized in FIGS. 4*c* and 4*d* by a dark shade of the respective sample holders.

FIGS. 5*a* and 5*b* depict a simplified lateral cross sectional view through a sensor device of an exemplary pipette auxiliary system measuring a capacitance by means of two electrodes, in the empty and filled state of the only depicted sample holder. The space between a pair of electrodes 22, 23 that each have the shape of a segment of a cylinder barrel placed around the sample-holding chamber 21 is constituted by a dielectric permeated by an electrical field E, so that a change of the capacitance is detected if the occupancy state in 21 is changed (FIG. 5*b*). The arrangement in FIGS. 5 *c* and 5*d* differs from that in FIGS. 5*a* and 5*b* essentially by the fact that the sample-holding chamber 21' of the variant in FIGS. 5*c* and 5*d* exhibits an essentially spherical bottom (round bottom). In this case, the electrodes 22', 23' are adjusted to the spherical shape and therefore exhibit in their lower parts spherically shaped plates. Correspondingly, the arrangement in FIGS. 5*e* and 5*f* differs from that in FIGS. 5*a* and 5*b* essentially by the fact that the sample-holding chamber 21" of the variant in FIGS. 5*e* and 5*f* has an essentially conically shaped bottom (conical bottom). In this case, the electrodes 22", 23" are adjusted to that conical shape and therefore exhibit in their lower parts a conically shaped plate. A light element (not depicted) of the output device can be a component of each the sample-holding arrangement 20 or the base apparatus 10.

FIGS. 6*a* and 6*b* depict a simplified lateral cross sectional view through a sensor device of another exemplary pipette auxiliary system measuring a capacitance by means of one electrode, in the empty and filled state of the only depicted sample holder. By means of a single ring electrode 42, which is arranged at the upper edge of the sample holder 41 the approach a conductive pipette tip or a pipette tip of a non-conductive material filled with a conductive aqueous solution is detected. Approaching the pipette tip increases the measured capacitance, so that the occupancy state "pipette tip is present" can be recognized with a suitable threshold value. In the example, the ring electrode 42 is partially embedded into the material of the sample-holding arrangement 40, the ring electrode 42 is located underneath the plane A. The ring electrode can also be arranged on a surface of the sample-holding arrangement 40 and can for example be deposited as a thin plate, foil, or layer. By means of this arrangement at the surface of the sample-holding arrangement 40 it is ascertained that the sample-holding arrangement 40 including its measurement arrangement is located underneath the plane A. A light element (not depicted) of the output device can be component of each the sample-holding arrangement 40 or the base apparatus 30.

FIGS. 7*a* and 7*b* depict a simplified lateral cross sectional view through a sensor device of another exemplary pipette auxiliary system measuring optically by means of two optical measurement elements, in the empty and filled state of the only depicted sample holder. A light beam (infrared) emitted from the LED 66 reaches the mirror element 83 that deflects the beam through the measurement chamber 8 and to the next mirror element 84. From there, the beam is deflected onto the light sensor 67 that can be in particular a photodiode or a CMOS sensor. The electrical control of the optical measurement elements 66, 67 associated to the optical sensor device and arranged in the base apparatus 60 occurs via the individual conductors 65*a*, 65*b* that are also arranged in the base apparatus. By inserting an object, e.g. a liquid sample into the measurement chamber measured by the beam, a change of the occupancy state can be registered optically. A light element (not depicted) of the output device can be component of each the sample-holding arrangement 80 or the base apparatus 30.

FIG. 8*a* depicts a sample-holding arrangement 120 according to the second preferred embodiment of the invention in an exemplary embodiment as preferred component of an exemplary embodiment of the pipette auxiliary system according to the present invention. Here, the light elements 118*a* are each arranged centrally and directly underneath the sample holder 121, so that is can be illuminated symmetrically.

FIG. 8*b* depicts a base apparatus according to the second preferred embodiment of the invention in an exemplary embodiment as preferred component of an exemplary embodiment of the pipette auxiliary system according to the present invention, that can be in particular utilized with the sample-holding arrangement in FIG. 8*a*. The positioning device 112*a*, 112*b* is fabricated analog to FIG. 2*b*. Equally the control device 113.

FIG. 8*c* depicts a pipette auxiliary system, in working position, comprising the sample-holding arrangement from FIG. 8*a* and the base apparatus from FIG. 8*b*. In the second preferred embodiment of the invention depicted in FIG. 8*b*, the plurality of measurement elements 116, 117 of the measurement arrangement 119 and the light arrangement 118 with light elements 118*a* are fixed components of the base apparatus 110. The sample-holding arrangement 120 comprises a plurality of openings 122, 123 for accepting the measurement elements 116, 117 in the working position. Such a sample-holding arrangement 120 that does not have to comprise electrical conductors or electrically conductive areas, can be fabricated easily and precisely by means of injection molding.

FIG. 9*a* depicts a sample-holding arrangement according to the third preferred embodiment of the invention in an exemplary embodiment as preferred component of an exemplary embodiment of the pipette auxiliary system according to the present invention. in the third preferred embodiment of the invention depicted in FIG. 9*c*, the plurality of measurement elements 222, 223 of the measurement arrangement 228 and a plurality of light elements 224 of the light arrangement 229 are fixed components of the sample-holding arrangement. The other components are fabricated essentially analog to the embodiments in FIGS. 2*c* and 8*c*.

FIG. 9*b* depicts a base apparatus according to the third preferred embodiment of the invention in an exemplary embodiment as preferred component of an exemplary embodiment of the pipette auxiliary system according to the present invention, that can be in particular utilized with the sample-holding arrangement in FIG. 9*a*.

FIG. 9*c* depicts a pipette auxiliary system, in working position, comprising the sample-holding arrangement of FIG. 9*a* and the base apparatus of FIG. 9*b*.

FIG. 10 depicts a perspective view of pipetting system 300 according to the present invention and according to another preferred embodiment. Two base apparatus 10, 10" that can essentially correspond for example to the base apparatus 10, 10" depicted in FIG. 2*b* are connected via a signal exchange 1 data exchange connection "D". Here, the sample-holding apparatus 20, 20" are designed as depicted in FIG. 2*a*. The control devices of these base apparatus 10, 10" that can exchange signals between each other are configured to assist the user of the manual pipetting apparatus 70 at the execution of a transfer process. In this, the user should, according to a pipetting planning program, which is executed by at least one control device, take up samples from the first columns of the sample plate 20 by means of the pipette 70 and transfer them into the second sample column of the sample plate 20". The pipetting planning program resp. control device executing this program is configured to illuminate the first column of the sample plate 20 in a color. This is symbolized in FIG. 10 by a darker shade of the first column of sample holders of the sample plate 20. Now, the user takes up the samples by pipetting in that column. After the uptake, the success or failure of the uptake from this first column of the sample plate 20 is signaled to the user by the system through a change of the illumination type of that first column of the sample plate 20. The success has been verified with the measurement arrangement of the sample plate 20. The target position for the samples contained now in the pipette tips 71, here the fourth column from the right, is indicated to the user by an illumination in the second sample plate 20". Now, the user releases the samples by pipetting in that column. After the release, the success or failure of the release into that fourth column of the sample plate 20" is signaled to the user by the system through a change of the illumination type of that fourth column of the sample plate 20". The success has been verified by the measurement arrangement of the sample plate 20". This assistance during the transfer of the sample between two sample-holding arrangements monitored by the pipette auxiliary systems is continued until the pipetting planning program has terminated.

The FIG. 10*b* depicts a pipette auxiliary system 400 that comprises as a component a pipette 70'. The pipette 70' resp. its—termed here as "second"—electronic control device that controls also the electronically operated pipetting of the pipetting apparatus 70' is configured to exchange signals resp. data, in particular data of a pipetting planning program and occupancy state data, via a signal connection, here a wireless data connection W, with the electronic control device of the base apparatus 10" of the pipette auxiliary system. The electronic control device of the pipetting apparatus 70' is configured to control the measurement arrangement via the electronic control device of the pipette auxiliary device and to receive the information on the occupancy state in form of occupancy state data. It would also be possible, that the electronic control device controls also the output device—this means, that the electronic control device of the pipetting apparatus 70' can be deployed as the electronic control device of a pipette auxiliary system. The electronic control device is configured to detect the approach of the at least one sample transfer container 71 connected with the pipetting apparatus to the at least one sample holder by measurement by means of the measurement arrangement, and to control the pipetting apparatus such that it autonomously releases each intended volume to the at least one sample holder. The electronic control device or the second control device is configured to execute a pipetting planning program, according to which

- the information on each next at least one sample holder of the sample-holding arrangement intended as target position for pipetting is displayed to the user by means of the output device, —here, a pipetting plan with a non successive pipetting at the wells, which is difficult to execute for the user without support,
- the manually operated approach of at least one sample transfer container to the sample-holding arrangement and the recognition of the position of the reached sample holder is detected by means of the measurement arrangement,
- it is detected by comparison with the planning data of the pipetting planning program whether the reached position is the intended target position according to the plan,
- and, in case the reached position is the intended target position according to the plan, a predefined sample volume is released automatically to the target position,
- and, in case the reached position is not the intended target position according to the plan, this automatic release is suppressed.

By means of a pipette auxiliary system according to the present invention users work without the risk of confusion at sample-holding arrangements consisting in particular of plates, stripes and vessels. The user knows always, which wells are to be filled next in a process, and which occupancy state is present in each sample holder. The base apparatus is a mobile, compact plate positioning tool with a small footprint. It can in particular be built into laboratory-workstations for the additional control of the executed experiments. A sample-holding arrangement can, if necessary, be fabricated as a closed system, in particular when using sample-holding arrangements fabricated by means of a two shot molding process that comprises in particular a conductive polymer as electrically conductive sections.

If required, a sample-holding arrangement can also be fabricated as "open system", i.e. with openings or cavities for the insertion of e.g. capacitance sensor sheets or sensor columns (see FIG. 8*a*) that are arranged at the base apparatus.

FIG. 11*a* depicts a sample-holding arrangement 120' according to the second preferred embodiment of the invention in an exemplary embodiment as preferred component of an exemplary embodiment of the pipette auxiliary system according to the present invention 100'. In contrast to the cavities 122, 123 in the embodiment example of FIG. 8*a*, the sample-holding arrangement 120' comprises here only one single cavity 122' that stretched underneath all sample holders 121' of the sample-holding arrangement 120', and which is opened to the bottom, so that measurement electrodes 116', 117' can reach into the cavity 122'.

FIG. 11*b* depicts a base apparatus 110' according to the second preferred embodiment of the invention in an exemplary embodiment as preferred component of an exemplary embodiment of the pipette auxiliary system according to the present invention 100', that can be in particular utilized with the sample-holding arrangement in FIG. 11*a*. The measurement electrodes 116', 117' of the measurement arrangement 119' are connected via conductors 115*a*, 115*b* with the control device 113 and are tightly connected with the base apparatus 110' which is designed moreover as the base apparatus 110. The measurement electrodes 116', 117' reach from below along a fraction f=0.15 of the entire height of the positioning space into that.

FIG. 11*c* depicts a pipette auxiliary system 100', in working position, comprising the sample-holding arrangement of FIG. 11*a* and the base apparatus of FIG. 11*b*. In the working position, two measurement electrodes 116', 117' of a sensor device are arranged each in the range underneath a sample holder 121' and translated laterally with respect to it, so that the sample holder is encompassed by the electrical field that builds up between the electrodes 116' and 117' and that extends also into the range above the electrodes 116', 117'. This will be explained in relation to FIG. 12*a*. The sample holders are of a cylindrical shape, but they can also be shaped conically or be rounded, or they can be shaped differently. As the electrical field generated by the measurement electrodes extends into the volume above this space between the electrodes, also the liquid placed in this range influences on the measurement resp. the liquid place there can be detected and the respective filling level can be distinguished from a different filling level, in which there is no liquid in the volume range above this space between the electrodes and the liquid is placed only in the space between the electrodes. The measurement arrangement 119' is particularly compact and robust.

FIG. 12*a* depicts a simplified lateral cross sectional view through a sensor device of an exemplary pipette auxiliary system measuring a capacitance by means of two planar plate-shaped electrodes 116', 117', in the filled state of the only depicted sample holder, with the sensor device corresponding to sensor devices depicted in FIGS. 11*b* and 11*c*. The sample-holding arrangement 120" and 120' as well as the sample holder 120" and 120' correspond to each other. A light element (not depicted) of the output device can be a component of each the sample-holding arrangement 120', 120" or the base apparatus 110', 110".

FIG. 12*b* depicts a simplified lateral cross sectional view through a sensor device of an exemplary pipette auxiliary system measuring a capacitance by means of two plate-shaped electrodes 116", 117", in the filled state of the only depicted sample holder. Here, the measurement electrodes 116", 117" of the sensor devices are integrated into the surface of the base apparatus 110". The measurement electrodes 116", 117" are here planar and plate-shaped and stretch parallel to the surface of the base apparatus. The measurement electrodes 116", 117" do not reach into the positioning space, in which, in the working position, the sample-holding arrangement 120" is arranged. Therefore, it does not require a cavity for inserting the measurement electrodes, but such a cavity would also be possible, as the electric field that effectuates the measurement extends into the volume range above the measurement electrodes in which also at least the lower section of the sample holder is arranged. By arranging the measurement electrodes in the range underneath the positioning space, this solution is particularly compact and robust. In particular, a protective layer or a coating can be provided above the measurement electrodes, without rendering the measurement ineffective. By this, one obtains a surface, which is easy to clean and that protects the measurement electrodes.

FIG. 12*c* depicts a sensor device that differs from the sensor device depicted in FIG. 12*b* by the fact that the plate-shaped electrodes 116'" and 117'" exhibit a larger area than the plate-shaped electrodes 116" and 117" from FIG. 12*b*. This area that extends parallel to the opening of the sample holder directed upwards and that extends in the present example also parallel to the planar bottom of the sample holder 121", is nearly as big as the bottom area and the average cross sectional area of the sample holder in vertical direction. The shape of the electrodes 116'", 117'" are that of a semicircle each, with the straight edges of the semicircles being parallel to each other and neighboring—in the figure visible as the gap between the electrodes.

The invention claimed is:

1. Pipette auxiliary system (1; 50; 100; 100'; 200; 300; 400) for supporting the manual pipetting, or respectively, dispensing of a plurality of samples in a working position of a sample-holding arrangement (20; 120; 120'; 120"; 220) by means of a user-guided pipette or dispenser apparatus, with the pipette auxiliary system comprising:

a base apparatus (10; 110; 110'; 210) with a positioning device (12*a*, 12*b*; 112*a*, 112*b*; 212*a*, 212*b*), which is configured for positioning of the sample-holding arrangement in the working position inside a positioning space (11; 111, 211) of the base apparatus, which is open at least along one horizontal plane (A) for pipetting, the sample-holding arrangement (20; 120; 120'; 120"; 220), comprising a plurality of sample holders (21; 121; 121; 121"; 221), a measurement arrangement (28; 48; 119; 119'; 228) comprising a plurality of measurement elements (22, 23; 22'; 23'; 22"; 23"; 116; 117; 116'; 117'; 116"; 117"; 116'"; 117'"; 222, 223; 42), that are, at least in a working position, positioned at a lateral side of the sample holders, underneath that horizontal plane (A), and with which an occupancy state of at least one sample holder in the working position is detectable, the lateral side of a sample holder meaning a position translated in a radial direction with respect to a vertical central axis of the sample holder, an output device (18; 18"; 38; 118; 229) for outputting to a user information on the occupancy state of at least one sample holder, and an electronic control device (13; 33; 113; 213), which is configured to detect the occupancy state of at least one sample holder in the working position by controlling the measurement arrangement and to output, in accordance with the occupancy state of the at least one sample holder, to the user the information on the occupancy state of said at least one sample holder, wherein the positioning device comprises a carrier section being a plate section onto which the sample-holding arrangement is rested and the measurement arrangement is, at least in the working position, arranged partially or completely in the positioning space above the plate section of the base apparatus and connected electrically via electrical contact sites with corresponding contact sites located on a top side of the plate section in the positioning space, and wherein the plurality of measurement elements is a fixed component of the sample-holding arrangement and the output device is a fixed component of the base apparatus.

2. Pipette auxiliary system (300) according to claim 1, comprising at least one first base apparatus (10) and one second base apparatus (10"), at least one first measurement arrangement (28) and one second measurement arrangement (28"), and at least one first output device (18) and one second output device (18"), with the electronic control device being configured to control the first measurement arrangement (28), the second measurement arrangement (28"), the first output device (18) and/or the second output device (18").

3. Pipette auxiliary system according to claim 1, with the output device being a light arrangement (18; 38; 118; 229), which is suitable for illuminating the sample-holding arrangement in function of the occupancy state of the at least one sample holder.

4. Pipette auxiliary system according to claim 3, with the electronic control device being configured to implement one of the following functions:

a type of illumination of at least one sample holder is dependent on the measured occupancy state of the sample holder;

a type of illumination of at least one second sample holder is dependent on the measured occupancy state of at least one first sample holder;

in case of the user approaching at least one sample transfer container to an erroneous sample holder that has not been selected by the electronic control device as target for a next manual pipetting, the illumination type of the erroneous sample holder is changed.

5. Pipette auxiliary system according to claim 4, comprising an external device, which is arranged separately from the base apparatus, and that comprises a data processing device, with the base apparatus comprising a data processing electronic device, with which the measurement arrangement and the light arrangement are controlled, with the measurement values corresponding to the occupancy states, measured by the measurement arrangement being stored by the electronic control device as occupancy state data in a data storage device of the external device.

6. Pipette auxiliary system according to claim 5, with the base apparatus comprising a data-processing electronic control device that controls the measurement arrangement and the light arrangement, and the data-processing electronic control device containing a micro controller with Touch Sensing Controller (TSC) hardware.

7. Pipette auxiliary system according to claim 1, with the pipette auxiliary system comprising said pipetting apparatus or dispenser apparatus, which each comprise said electronic control device or a second electronic control device, controlling the electronically operated pipetting or dispensing of the pipetting apparatus or dispenser apparatus, with said electronic control device and/or the second electronic control device being configured to control the measurement arrangement and/or the output device via a signal connection.

8. Pipette auxiliary system according to claim 7, with the electronic control device or the second electronic control device of the pipetting apparatus or dispenser apparatus being configured to control the measurement arrangement and to receive information on the occupancy state in form of occupancy state data.

9. Pipette auxiliary system according to claim 8, with the electronic control device or the second electronic control device being configured to detect an approach of an at least one sample transfer container, which is connected to the pipetting apparatus or the dispenser apparatus to the at least one sample holder by measurement with the measurement arrangement, and to control the pipetting apparatus or dispenser apparatus in such a way that these release autonomously an intended volume each into the at least one sample holder.

10. Pipette auxiliary system according to claim 9, with the electronic control device or the second electronic control device being configured to execute a pipetting planning program, according to which the information on the at least one sample holder of the sample-holding arrangement intended as the each next target position for the pipetting is displayed to the user by means of the output device, the manually operated approach of the at least one sample transfer container to the sample-holding arrangement is detected by the measurement arrangement and the position of the reached sample holder is recognized, it is detected by comparison with the planning data of the pipetting planning program whether the reached position is the intended target position according to the plan, and, in case the reached position is the intended target position according to the plan, a predefined sample volume is released automatically to the target position, and, in case the reached position is not the intended target position according to the plan, this automatic release is suppressed.

11. Pipette auxiliary system according to claim 1, with the measurement elements being configured as electrodes, and in which the measurement arrangement is configured for the measurement of a capacitance value between the electrodes of a sample holder of the plurality of sample holders, with that capacitance value being influenced by a content of the sample-holding chamber of the sample holder, for the purpose of measuring the occupancy state by a measurement of the capacitance.

12. Pipette auxiliary system according to claim 11, with the measurement elements being designed as electrodes, and with the electrodes comprising an electrically conductive polymer, or consisting thereof.

13. Pipette auxiliary system according to claim 11, with each of the sensor devices of the measurement arrangement that comprise at least one measurement element being configured such that the number M of distinguishable occupancy states of the at least one sensor device is $2<=M<=10$.

14. Method for the measurement of an occupancy state of a sample holder by means of the pipette auxiliary system according to claim 1, comprising the step: measuring the occupancy state by measuring a capacitance or a change of capacitance of at least one measurement element implemented as an electrode, when a sample transfer container of a non-conductive material, filled with a conductive sample, is approached to the electrode.

15. Base apparatus for supporting a manual pipetting of a plurality of samples in a working position of a sample-holding arrangement that comprises a plurality of sample holders, comprising a positioning device, which is configured for positioning the sample-holding arrangement in the working position in a positioning space of the base apparatus, which is opened at least along one plane for pipetting, the positioning device comprising a carrier section being a plate section onto which the sample-holding arrangement is rested in the working position, a measurement arrangement for detecting, in the working position, an occupancy state of at least one sample holder, the measurement arrangement comprising a plurality of measurement elements which are connected electrically via electrical contact sites with corresponding contact sites located on a top side of the plate section in the positioning space and positioned at least in the working position at the lateral side of the sample holders, underneath the one plane and partially or completely in the positioning space above the plate section, the lateral side of a sample holder meaning a position translated in a radial direction with respect to a vertical central axis of the sample holder, and an output device configured for outputting an information of the sample-holding arrangement in dependence of the occupancy state, that has been measured by means of the measurement elements of the sample-holding arrangement.

* * * * *